(12) United States Patent
Hejna et al.

(10) Patent No.: US 7,378,044 B1
(45) Date of Patent: May 27, 2008

(54) METHOD FOR MANUFACTURING WOOD-BASED COMPOSITE PANEL HAVING FOIL OVERLAY

(75) Inventors: Donald J. Hejna, Bemidji, MN (US); Stephen B. Bailey, Bemidji, MN (US); Michael C. Wagner, Bemidji, MN (US); Thomas G. Herion, Spokane, WA (US)

(73) Assignee: Potlatch Corporation, Bemidji, MN (US)

( * ) Notice: Subject to any disclaimer, the term of this patent is extended or adjusted under 35 U.S.C. 154(b) by 738 days.

(21) Appl. No.: 10/731,067

(22) Filed: Dec. 9, 2003

Related U.S. Application Data

(62) Division of application No. 10/163,861, filed on Jun. 5, 2002, now Pat. No. 6,800,352.

(60) Provisional application No. 60/338,906, filed on Nov. 5, 2001.

(51) Int. Cl.
*B32B 31/00* (2006.01)

(52) U.S. Cl. .................. 264/113; 156/87; 156/252; 156/307.3; 156/307.7

(58) Field of Classification Search .............. 264/113, 264/112; 156/87, 252, 253, 264, 307.3, 307.4, 156/307.7, 51.3, 514, 517, 521; 52/408, 52/409, 411
See application file for complete search history.

(56) References Cited

U.S. PATENT DOCUMENTS

| | | | | |
|---|---|---|---|---|
| 3,041,219 A | * | 6/1962 | Steck | 428/138 |
| 4,148,781 A | * | 4/1979 | Narukawa et al. | 523/222 |
| 4,263,360 A | * | 4/1981 | Adelman | 428/292.4 |
| 4,326,909 A | | 4/1982 | Slavik | 156/253 |
| 4,364,984 A | * | 12/1982 | Wentworth | 428/106 |
| 4,865,912 A | * | 9/1989 | Mitsumata | 442/378 |
| 5,064,592 A | * | 11/1991 | Ueda et al. | 264/112 |
| 5,231,814 A | * | 8/1993 | Hageman | 52/408 |
| 5,478,427 A | * | 12/1995 | Huver et al. | 156/273.3 |
| 5,665,798 A | * | 9/1997 | Speaks et al. | 524/14 |
| 6,136,408 A | * | 10/2000 | Radcliffe et al. | 428/107 |
| 6,251,495 B1 | * | 6/2001 | Wilson et al. | 428/133 |
| 6,286,280 B1 | * | 9/2001 | Fahmy et al. | 52/408 |
| 6,599,454 B1 | * | 7/2003 | Hesch | 264/109 |
| 6,926,785 B2 | * | 8/2005 | Tanzer et al. | 156/87 |
| 2002/0037405 A1 | * | 3/2002 | Naipawer et al. | 428/351 |

* cited by examiner

Primary Examiner—Jill L. Heitbrink
(74) Attorney, Agent, or Firm—Schwegman, Lundberg & Woessner, P.A.

(57) ABSTRACT

The present invention provides a product that includes (a) a wood-based composite panel having a pair of outer surfaces; and (b) a radiant barrier material having a pair of outer surfaces, wherein at least a portion of an outer surface of the radiant barrier material is adhered to at least a portion of an outer surface of the wood-based composite panel; wherein the radiant barrier material that includes apertures such that the apertures are present in about 49 apertures per square inch of radiant barrier material or less, inclusive. The invention also includes methods for manufacturing such product.

89 Claims, 7 Drawing Sheets

METHOD FOR MANUFACTURING WOOD-BASED COMPOSITE PANEL HAVING FOIL OVERLAY

RELATED APPLICATIONS

This application is a Divisional of U.S. Ser. No. 10/163,861 filed Jun. 5, 2002, now U.S. Pat. No. 6,800,352 which claims priority to U.S. Ser. No. 60/338,906, filed Nov. 5, 2001. These applications are incorporated by reference herein.

BACKGROUND OF THE INVENTION

Oriented Strand Board (OSB) is an engineered structural-use panel manufactured from thin wood strands bonded together with resin under heat and pressure. OSB is used extensively for roof, wall, and floor sheathing in residential and commercial construction. Many building structures that include OSB are located in areas that are sunny and/or hot. These areas include southern California, Arizona, Nevada, New Mexico, Texas, and Florida. The building structures in these locations typically have roof structures that inherently have minimal thermal insulating and emissivity barrier properties.

When in use and upon exposure to large durations of heat and/or sunlight, OSB will typically absorb and trap (i.e., retain) a significant portion of the radiant energy. The OSB will also typically emit (e.g., up to about 90%) the radiant energy. This results in an increase of the temperature on the inside of the dwelling (e.g., the attic). In fact, under conventional home construction conditions, the air temperature in attics and ceilings can be raised to about 140° F. or higher. Either the homeowner undergoes severe discomfort due to elevated temperatures inside the dwelling or they must pay a high price for installing and operating air conditioning. A considerable amount of energy, therefore, is typically expended to reduce the temperature of the inside of the dwelling. This energy may not only be costly, but may not be available during a given period of time (e.g., during a brown out or black out).

U.S. Pat. No. 5,231,814 issued to Hageman claims and discloses a roof structure. The roof structure includes roof decking material that includes a wood roof sheathing panel material having an inner side and an outer side; and a sheet of foil material having one surface adhered to the inwardly facing surface of sheet of sheathing panel material (See, e.g., claim 1).

The foil material disclosed therein includes a plurality of substantially uniformly distributed perforations through the foil material to permit passage of moisture therethrough (See, e.g., claim 1). The expressed reason for introducing the perforations into the foil material is to permit the passage of moisture between the moisture barrier layer and the roof (See, e.g., column 2, lines 42-49). In this way, it is thought that a significant portion of excess moisture can be released through the perforations located in the foil material thereby permitting the roof decking to "breathe" (See, e.g., column 2, lines 42-49). If a significant portion of the excess moisture is not released, unwanted degradation of the substrate can result (See, e.g., column 2, lines 42-49). Moisture can be present due to, for example, water vapor which enters the house during construction (before the roof is put on), or after construction from roof leaks of various types. Unwanted moisture can also result from the cumulative effect of vapor condensation. Moisture can also be introduced from the occupants in the building.

One drawback associated with the article of manufacture claimed and disclosed therein is that the density of the perforations is in the order of 125 per square inch, or 50 to 160 per square inch (See, e.g., column 3, lines 15-18). U.S. Pat. No. 5,231,814 does not disclose or suggest an article of manufacture having perforations on the order of about 50 or less, inclusive, while possessing suitable emmissivity and vapor permeable properties. As such, it would be beneficial to have a roof sheathing panel material with foil material adhered thereto wherein the foil material includes perforations on the order of about 50 or less, inclusive, while maintaining the suitable emmissivity and vapor permeable properties.

Another drawback associated with the article of manufacture claimed and disclosed therein is that the article of manufacture is manufactured in an "off line" or "cold press" manner. See, e.g., column 2-6. As such, the '814 patent does not disclose or suggest how to make the article of manufacture via an "in line" or "hot press" method. Forming a product that includes a wood-based composite panel and a metallic material adhered to the wood-based composite panel via an "in line" or "hot press" method would be relatively inexpensive and easier to manufacture, as compared to the article of manufacture manufactured via an "off line" or "cold press" method.

U.S. Pat. No. 6,251,495 B1, assigned to Louisiana-Pacific Corp., claims and discloses a method for producing a product which is an underlying substrate, having a pair of outer major surfaces and a radiant barrier material adhered to at least one of the pair of outer major surfaces of the underlying substrate with an adhesive material to form a radiant barrier material covered substrate. See, e.g., Abstract. A plurality of apertures are formed in the radiant barrier material covered substrate. See, e.g., Abstract. These apertures extend substantially completely through both the radiant barrier material and the adhesive material thereby forming substantially completely open moisture vapor flow channels which create a high level of moisture vapor permeability through the radiant barrier material and the adhesive material. See, e.g., Abstract. In this way, a substantial amount of trapped excess moisture can pass from the underlying substrate into the surrounding atmosphere to avoid unwanted degradation of the underlying substrate, while maintaining the low level of emissivity of the product. See, e.g., Abstract.

One drawback associated with the method of producing the article of manufacture claimed and disclosed therein is that method is limited solely to a "cold press" method and does not disclose or suggest producing the article of manufacture via a "hot press" method. Specifically, the method disclosed and recited therein requires for "providing an underlying wood-based product," "adhering a radiant barrier material to at least one of said pair of outer surfaces of said underlying substrate . . . to form a radiant barrier material covered substrate," and "forming said product by introducing a plurality of apertures into said radiant barrier material covered substrate." See, e.g., claim 1. Forming a product which includes a wood-based composite panel and a metallic material adhered to the wood-based composite panel via a "hot press" method would be relatively inexpensive and easier to manufacture, as compared to the article of manufacture manufactured via a "cold press" method.

Another drawback associated with the method of producing the article of manufacture claimed and disclosed therein is that the adhesive employed in adhering the radiant barrier material (i.e., the backing layer and the metallic foil) to the underlying wood-based substrate may not be suitable under the "hot press" conditions (e.g., temperature and pressure). Specifically, the resin disclosed therein may not possess the requisite adhesiveness during the pressing stage. As such, the adhesive disclosed therein would likely not effectively maintain the adhesive properties during the manufacturing parameters of a "hot press" method.

Accordingly, what is needed is an article of manufacture useful in the wood products industry. The article of manufacture includes a wood-bases substrate and at least one layer of foil attached to the wood-based substrate. The foil will reflect a substantial amount of the radiant energy and/or will limit or stop a substantial amount of radiant energy from passing through. The radiant barrier OSB product can be manufactured via a "hot press" method. More specifically, the foil (with apertures located thereon) can be contacted with the flakes prior to the pressing stage, thereby providing a wood-based composite panel having a foil overlay.

The radiant barrier plywood product could be manufactured either via a "cold press" or a "hot press" manner. As such, each of the components of the article of manufacture can withstand the manufacturing conditions of any pressing stage involved in the manufacturing process of the article of manufacture. The manufacturing conditions include time, temperature, and pressure. More specifically, the foil, with apertures located thereon, can be contacted with the veneers prior to the pressing stage, thereby providing a wood-based composite panel having a foil overlay.

Additionally, what is needed is a method to produce an article of manufacture having a foil overlay via a "hot press" method. The article of manufacture will preferably include perforations or apertures on the order of about 50 or less, inclusive, while possessing suitable emmissivity and vapor permeable properties. The article of manufacture will include perforations or apertures located in the foil material that optionally do not become wholly or partially plugged by the adhesive material.

SUMMARY OF THE INVENTION

The present invention provides a radiant barrier wood-based composite panel and a methods of manufacturing the same. The radiant barrier wood-based composite panel includes a radiant barrier material that retains its radiant barrier properties (i.e., emissivity) during the manufacturing of the radiant barrier wood-based composite panel. The radiant barrier wood-based composite panel includes radiant barrier material that retains its radiant barrier properties over the extended periods of time typically encountered with the lifespan of the radiant barrier wood-based composite panel. The radiant barrier wood-based composite panel includes a resin that retains its adhesiveness during the manufacturing of the radiant barrier wood-based composite panel. During the manufacture of the radiant barrier wood-based composite panel, the radiant barrier material retains its radiant barrier properties in the presence of the resin. Additionally, the each of the resins employed can effectively cure in the presence of the radiant barrier material.

The radiant barrier wood-based composite panel includes a radiant barrier material. The radiant barrier material will reflect a substantial amount of the radiant energy and/or will limit or stop a substantial amount of radiant energy from passing through; while allowing vapor to pass. The radiant barrier wood-based composite panel can be manufactured via a "hot press" method or a "cold press" method. As such, each of the components of the radiant barrier wood-based composite panel (e.g., each of the adhesive(s), resin(s), backing material, and metallic material) can withstand the manufacturing conditions of any step involved in the manufacturing process of the radiant barrier wood-based composite panel.

For example, the radiant barrier OSB product can be manufactured via a "hot press" method, wherein the radiant barrier material, with apertures located thereon, can be contacted with the flakes just prior to the pressing stage. As such, the flakes of wood can be pressed at an elevated temperature and at an elevated pressure to form an underlying wood-based composite panel, while the radiant barrier material is adhered to the resulting underlying wood-based composite panel.

The present invention provides a product that includes (a) a wood-based composite panel having a pair of outer surfaces; and (b) a radiant barrier material having a pair of outer surfaces, wherein at least a portion of an outer surface of the radiant barrier material is adhered to at least a portion of an outer surface of the wood-based composite panel; wherein the radiant barrier material that includes apertures such that the apertures are present in about 49 apertures per square inch of radiant barrier material or less, inclusive.

The present invention also provides a radiant barrier oriented strand board that includes (i) flakes of wood adhered together with a first resin; (ii) a radiant barrier material adhered to at least a portion of the flakes of wood; wherein the radiant barrier material includes apertures such that the apertures are present in about 49 apertures per square inch of radiant barrier material or less, inclusive.

The present invention also provides a product that includes (a) a wood-based composite panel having a pair of outer surfaces; and (b) a radiant barrier material having a pair of outer surfaces, wherein at least a portion of an outer surface of the radiant barrier material is adhered to at least a portion of an outer surface of the wood-based composite panel; the product prepared by the process that includes the following steps: (i) contacting a blanket of substantially oriented flakes of wood with a radiant barrier material having the apertures located therein; wherein the flakes of wood including a first resin located on at least a portion of the surface of the flakes of wood; wherein the radiant barrier material has a pair of outer surfaces and a second resin located on at least a portion of one side of the pair of outer surfaces of the radiant barrier material, such that the flakes of wood contact the second resin; and (ii) curing the first resin and the second resin by exposing the first resin and the second resin to at least one of an elevated temperature, an elevated pressure, and radiant energy; for a sufficient period of time; to effectively cure the first resin and the second resin.

The present invention also provides a process for manufacturing a radiant barrier oriented strand board, the process that includes the steps: (i) contacting flakes of wood with a first resin; (ii) orienting, in substantially alternate lengthwise and crosswise layers, the flakes of wood to provide a blanket of substantially oriented flakes; (iii) contacting the blanket of substantially oriented flakes with a radiant barrier material having apertures located therein, wherein the radiant barrier material has a pair of outer surfaces and a second resin located on at least a portion of one side of the pair of outer surfaces of the radiant barrier material, such that when the blanket of substantially oriented flakes is contacted with the radiant barrier material, the blanket of substantially oriented flakes contacts the second resin; and (iv) curing the first resin and the second resin by exposing the first resin and the second resin to at least one of an elevated temperature, an elevated pressure, and radiant energy; for a sufficient period of time; to effectively cure the first resin and the second resin; thereby effectively providing a radiant barrier oriented strand board.

The present invention also provides a radiant barrier wood-based composite panel that includes (a) a wood-based composite panel having a pair of outer surfaces; (b) a resin that contacts at least a portion of an outer surface of the wood-based composite panel; and (b) a radiant barrier material having a pair of outer surfaces, wherein at least a portion of an outer surface of the radiant barrier material contacts at least a portion of the resin such that at least a portion of the radiant barrier material is adhered to at least a portion of the wood-based composite panel; wherein the radiant barrier material that includes apertures such that the apertures are present in about 49 apertures per square inch of radiant barrier material or less, inclusive.

The present invention also provides a radiant barrier plywood that includes (i) veneers of wood adhered together with a first resin; (ii) a radiant barrier material adhered to at least a portion of the veneers of wood; wherein the radiant barrier material that includes apertures such that the apertures are present in about 49 apertures per square inch of radiant barrier material or less, inclusive.

The present invention also provides a product that includes (a) a wood-based composite panel having a pair of outer surfaces; and (b) a radiant barrier material having a pair of outer surfaces, wherein at least a portion of an outer surface of the radiant barrier material is adhered to at least a portion of an outer surface of the wood-based composite panel; the product prepared by the process that includes the following steps: (i) contacting a stack of veneers of wood with a radiant barrier material having the apertures located therein; wherein the veneers of wood include a first resin located on at least a portion of the surface of the veneers of wood; wherein the radiant barrier material has a pair of outer surfaces and a second resin located on at least a portion of one side of the pair of outer surfaces of the radiant barrier material, such that the veneers of wood contact the second resin; and (ii) curing the first resin and the second resin by exposing the first resin and the second resin to at least one of an elevated temperature, an elevated pressure, and radiant energy; for a sufficient period of time; to effectively cure the first resin and the second resin.

The present invention also provides a process for manufacturing a radiant barrier plywood, the process that includes the steps: (i) contacting veneers of wood with a first resin; (ii) orienting, in substantially alternate lengthwise and crosswise layers, the veneers of wood to provide a stack of veneers; (iii) contacting the stack of veneers with a radiant barrier material having apertures located therein, wherein the radiant barrier material has a pair of outer surfaces and a second resin located on at least a portion of one side of the pair of outer surfaces of the radiant barrier material, such that when the stack of veneers is contacted with the radiant barrier material, the stack of veneers contacts the second resin; and (iv) curing the first resin and the second resin by exposing the first resin and the second resin to at least one of an elevated temperature, an elevated pressure, and radiant energy; for a sufficient period of time; to effectively cure the first resin and the second resin; thereby effectively providing a radiant barrier plywood.

DETAILED DESCRIPTION OF THE INVENTION

Figure 1:
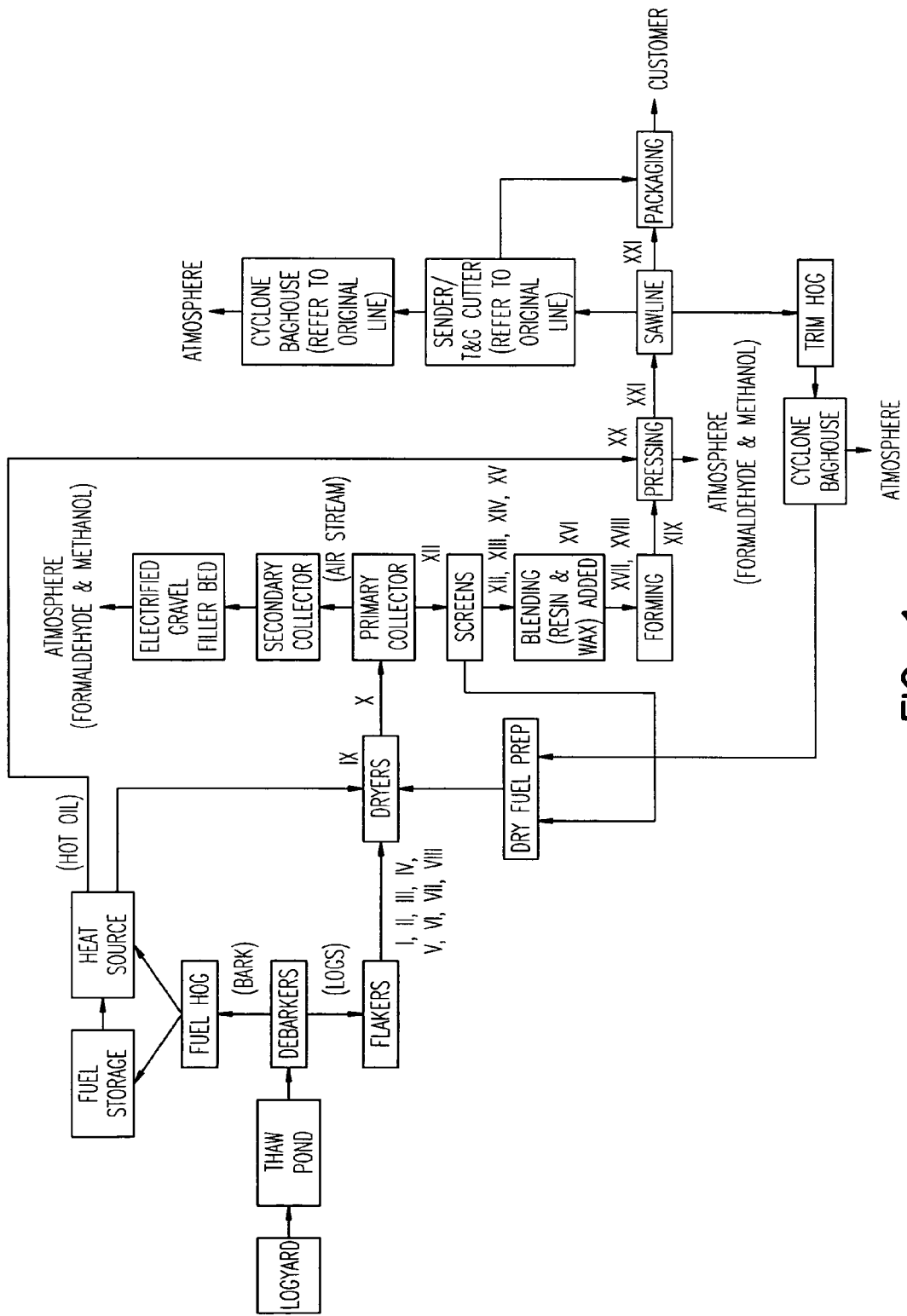
FIG. 1 illustrates a process flow of the radiant barrier oriented strand board (OSB) of the present invention wherein suitable locations and methods in which the resin can be introduced and applied to the flakes are shown in Roman numerals, which correspond to Tables I-II.

The present invention provides a radiant barrier wood-based composite panel and a methods of manufacturing the same. The radiant barrier wood-based composite panel includes a radiant barrier material that retains its radiant barrier properties (i.e., emissivity) during the manufacturing of the radiant barrier wood-based composite panel. The radiant barrier wood-based composite panel includes radiant barrier material that retains its radiant barrier properties over the extended periods of time typically encountered with the lifespan of the radiant barrier wood-based composite panel. The radiant barrier wood-based composite panel includes a resin that retains its adhesiveness during the manufacturing of the radiant barrier wood-based composite panel. During the manufacture of the radiant barrier wood-based composite panel, the radiant barrier material retains its radiant barrier properties in the presence of the resin. Additionally, each of the resins employed can effectively cure in the presence of the radiant barrier material.

The radiant barrier wood-based composite panel includes a radiant barrier material that will reflect a substantial amount of the radiant energy and/or will limit or stop a substantial amount of radiant energy from passing through; while allowing vapor to pass. The radiant barrier wood-based composite panel can be manufactured via a "hot press" method or a "cold press" method. As such, each of the components of the radiant barrier wood-based composite panel (e.g., each of the adhesive(s), resin(s), backing material, and metallic material) can withstand the manufacturing conditions of any step involved in the manufacturing process of the radiant barrier wood-based composite panel.

For example, the radiant barrier OSB product can be manufactured via a "hot press" method, wherein the radiant barrier material, with apertures located thereon, can be contacted with the flakes just prior to the pressing stage. As such, the flakes of wood can be pressed at an elevated temperature and at an elevated pressure to form an underlying wood-based composite panel, while the radiant barrier material is adhered to the resulting underlying wood-based composite panel.

This invention relates to a novel radiant barrier wood-based composite panel and to a method of making such a radiant barrier wood-based composite panel. When describing the radiant barrier wood-based composite panel and the method of making the same, the following terms have the following meanings, unless otherwise indicated.

DEFINITIONS

As used herein, "adhered" refers to sticking together by or as if by grasping, suction or being glued. It includes joining, fastening, glueing, bonding, and fusing. The "adhering" can be accomplished by chemical means (e.g., adhesive) by mechanical means (e.g., fastener), or a combination thereof.

As used herein, a "wood-based composite panel" refers to structural or non-structural product formed from a variety of materials including wood and/or wood substrate products (e.g., flakes or strands of wood, particles or particle strands of wood, as well as veneers of wood). These materials are optionally formed from moisture-containing substrates, permeable substrates, and substrates which are both moisture-containing and permeable. Suitable wood-based composite panels include, e.g., oriented strand board (OSB) and plywood. The lifespan of the wood-based composite panel can be, e.g., up to about 25 years, up to about 50 years, or up to about 100 years.

As used herein, "oriented strand board" or "OSB" refers to an engineered structural-use panel typically manufactured from thin wood strands bonded together with resin under heat, pressure, and/or radiant energy. The strands are typically dried, blended with resin and wax, and formed into thick, loosely consolidated mats or blankets that are pressed under heat and pressure into large panels. The strands in the core layers are usually aligned substantially perpendicular to the strand alignment of the face layers, like the cross-laminated veneers of plywood.

It is appreciated that those of skill in the art understand that OSB is typically characterized by those starting materials or intermediate components useful in making the OSB, e.g., resin and flakes of wood. While these materials may undergo a substantial conversion during the manufacturing of the OSB, reference to OSB as including these materials or components is acceptable and appropriate to those of skill in the art. For example, each of the flakes of wood and the resin, during the pressing step (e.g., curing), can undergo a chemical and/or physical conversion such that they may no longer expressly and literally meet the criteria to be classified as a resin and a flake of wood. Reference to the OSB as including a resin and flakes of wood is, however, acceptable and appropriate to those of skill in the art. As such, as used herein, "oriented strand board" includes resin(s) and flakes of wood.

As used herein, a "flake" refers to a thin stand of wood that is produced from a flaker. In addition, as used herein, a "green flake" refers to a flake that has not been dried. The flake can have any suitable size, provided the flake can be effectively cured with a suitable resin. For example, the flake can typically have a length (y-dimension) of up to about 12 inches (30.4 cm) or about 4.5 inches (11.4 cm) to about 6.0 inches (15.2 cm) and can typically have a width (x-dimension) of up to about 12 inches (30.4 cm) or about 1.5 inches (3.8 cm) to about 2.5 inches (6.4 cm). Likewise, the flake can typically have a thickness (z-dimension) of about 0.001 inches (0.0025 cm) to about 0.10 inches (0.254 cm), about 0.010 inches (0.0254 cm) to about 0.060 inches (0.1524 cm), or about 0.020 inches (0.0508 cm) to about 0.030 inches (0.076 cm). Typically, the width of the flake will be a function of the length of the flake. The length of the flake is typically at least about three times greater than the width of the flake. This allows for proper flake orientation and an OSB with acceptable physical properties.

As used herein, "blanket of flakes" refers to a plurality or mass of flakes having a discrete or continuous length, width, and height. The blanket of flakes can be formed, e.g., on a mat or a screen. A cross-sectional view of the blanket of flakes will typically illustrate that the flakes exist in multiple layers, thereby forming the blanket of flakes. In one embodiment, the blanket of flakes can have a discrete length, width, and height. In such an embodiment, the blanket of flakes can typically have a width of up to about 16 feet, of up to about 12 feet, up to about 8 feet, or up to about 4 feet; a length of up to about 48 feet, of up to about 36 feet, or up to about 24 feet; and a thickness of up to about 2 feet, of up to about 1 foot, of up to about 8 inches, of up to about 6 inches, or of up to about 2 inches.

In another embodiment of the present invention, the blanket of flakes can have a discrete width, and height and a continuous length. In such an embodiment, the mat length or screen length can be greater than about 10 feet, greater than about 20 feet, or greater than about 40 feet. Such a mat or screen is typically referred to as a "continuous mat" or "continuous screen." The length of the blanket of flakes in such embodiment can typically be greater than about 10 feet, greater than about 20 feet, or greater than about 40 feet. In such an embodiment, the blanket of flakes can typically have a width of up to about 16 feet, of up to about 12 feet, up to about 8 feet, or up to about 4 feet; and a thickness of up to about 2 feet, of up to about 1 foot, of up to about 8 inches, of up to about 6 inches, or of up to about 2 inches.

As used herein, "blanket of oriented flakes" refers to a blanket of flakes, as used herein, wherein each layer has flakes that are substantially perpendicular to the flakes in the layer directly below that specified layer (when present) and are substantially perpendicular to the flakes in the layer directly above that specified layer (when present).

As used herein, "plywood" refers to a laminate wood-based composite panel manufactured from thin wood veneers (i.e., laminates) bonded together with resin under heat and pressure. In one embodiment of the present invention, the plywood is manufactured from veneers of wood wherein each veneer is perpendicular to the veneer directly above (if present) and directly below (if present) that veneer. In another embodiment of the present invention, each of the veneers face the same direction (e.g., in the lengthwise direction) to form what is referred to as laminate veneer lumber (LVL). In another embodiment, the veneers can be randomly oriented.

It is appreciated that those of skill in the art understand that plywood is typically characterized by those starting materials or intermediate components useful in making the plywood, e.g., resin and veneers of wood. While these materials may undergo a substantial conversion during the manufacturing of the plywood, reference to the plywood as including these materials or components is acceptable and appropriate to those of skill in the art. For example, each of the veneers of wood and the resin, during the pressing step (e.g., curing), can undergo a chemical and/or physical conversion such that they will no longer expressly meet the criteria to be classified as a resin and a veneer of wood. Reference to the plywood as including a resin and veneers of wood, however, is acceptable and appropriate to those of skill in the art. As such, as used herein, "plywood" includes resin and veneers of wood.

Suitable plywood, and methods for making the same are disclosed, e.g., in Engineered Wood Products, A Guide for Specifiers, Designers and Users, Stephen Smulski, Ph.D, Editor in Chief, PFS Research Foundation, Madison, Wis. especially Chapter 2, Plywood by Michael McKAy; or Wood Handbook, Wood as an Engineered Material, reprinted from Forest Products Laboratory General Technical Report FPL-GTR-113 with consent of the USDA Forest Service, Forest Products Laboratory, especially Chapter 10-6, Wood Based Composites and Panel Products, Plywood. Specifically, the plywood can be any suitable plywood as manufactured by, e.g., Georgia-Pacific, Boise-Cascade, Nexfor Industries, Willamette, Roseburg Forest Products, Louisiana-Pacific, Weyerhaeuser, Hood Industries, Plum Creek, or Hunt Plywood Co.

As used herein, "particle board" refers to an engineered wood-based composite panel typically manufactured from wood particles bonded together with resin under heat, pressure, and/or radiant energy. The particles are typically dried, blended with resin and wax, and formed into thick, loosely consolidated mats or blankets that are pressed under heat and pressure into large panels.

A used herein, "wood particles" refers to particles of wood having an average diameter of up to about 0.05 inches, up to 0.005 inches, or up to 0.0005 inches.

As used herein, "continuous press" refers to a method of manufacturing a wood-based composite panel wherein a press mat moves into the press in a continuous manner. Such a manner can be accomplished, e.g., by employing a series of rollers that push down upon the flakes, veneers, or wood particles. Those of skill in the art typically refer to a continuous press as having no mat length. It is appreciated that those of skill in the art understand that such reference is intended to refer to mats having a length of more than 20 feet.

As used herein, "off-line" refers to a method of manufacturing a radiant barrier wood-based composite panels that includes two steps; one step to manufacture the wood-based composite panel and another step to adhere the radiant barrier to the wood-based composite panel. The off line process can include a "cold press" method of adhering the radiant barrier to the wood-based composite panel.

As used herein, "on-line" refers to a method of manufacturing a radiant barrier wood-based composite panels that includes one step. The one step involves both manufacturing the wood-based composite panel and adhering the radiant barrier to the wood-based composite panel. The on-line process can include a "hot press" method of adhering the radiant barrier to the wood-based composite panel.

As used herein, "manufacturing conditions" refers to those conditions such as time, temperature, and pressure, involved in any of the steps in the manufacturing of a radiant barrier wood-based composite panel. Those steps include, for example, the pressing stage.

As used herein, "elevated temperature" refers to any temperature above room temperature, 77° F. (25° C.). Typically, the elevated temperature can be above about 100° C. (212° F.), above about 150° C. (302° F.), above about 200° C. (392° F.), or up to about 250° C. (482° F.). Specifically, the elevated temperature can be about 77° F. (25° C.) to about 315° C. (599° F.), about 100° C. (212° F.) to about 315° C. (599° F.), about 77° F. (25° C.) to about 218° C. (425° F.), about 100° C. (212° F.) to about 218° C. (425° F.), or about 175° C. (374° F.) to about 218° C. (425° F.). Specifically, regarding oriented strand board (OSB) and methods for making the same, "elevated temperature" can be about 162° C. (325° F.) to about 246° C. (475° F.), can be about 177° C. (350° F.) to about 232° C. (450° F.), or about 191° C. (375° F.) to about 218° C. (425° F.). Specifically, regarding plywood and methods for making the same, "elevated temperature" can be about 107° C. (225° F.) to about 218° C. (425° F.), about 121° C. (250° F.) to about 204° C. (400° F.), or about 135° C. (275° F.) to about 191° C. (375° F.).

As used herein, "elevated pressure" refers to any pressure above standard pressure, 1 atm. (14.7 psi). Typically, the elevated pressure can be above about 5.0 atm (73.5 psi), above about 10.0 atm (146.9 psi), above about 20.0 atm (293.9 psi), above about 40.0 atm (587.8 psi), or above about 80.0 atm (1175.7 psi). Specifically, the elevated pressure can be about 60.0 atm. (881.8 psi) to about 85.0 atm (1249 psi). Specifically, regarding oriented strand board (OSB) and methods for making the same, "elevated pressure" can be about 25 atm. (367 psi) to about 55 atm. (808 psi), about 30 atm. (441 psi) to about 50 atm. (735 psi), about 34 atm. (500 psi) to about 48 atm. (705 psi), or about 35 atm. (514 psi) to about 45 atm. (661 psi). Specifically, regarding plywood and methods of making the same, "elevated pressure" can be about 8.0 atm. (118 psi) to about 21 atm (309 psi) or about 10.0 atm. (147 psi) to about 17 atm (250 psi).

As used herein, "resin" refers to an adhesive polymer of either natural or synthetic origin. As used herein, a "polymer" is a compound formed by the reaction of simple molecules having functional groups that permit their combination to proceed to higher molecular weights under suitable conditions. Synthetic polymers are chemically designed and formulated into the adhesive to perform a variety of bonding functions.

As used herein, "surface" refers to the outermost boundary of a substrate (e.g., flake, veneer, OSB, or plywood). The surface includes the top surface, the bottom surface and optionally the side surfaces.

As used herein, "impregnate" refers to the filling, permeation, or saturation of a material such as a resin into a substrate (e.g., flake, veneer, OSB, or plywood).

As used herein, "completely impregnate" refers to about 100% impregnation of a material such as a resin into a substrate (e.g., flake, veneer, OSB, or plywood).

As used herein, "partially impregnate" refers to an impregnation of a material such as a resin into a substrate (e.g., flake, veneer, OSB, or plywood), of less than about 100%. The impregnation can be up to about 1/100 of the substrate, up to about 1/50 of the substrate, up to about 1/10 of the substrate, up to about 1/4 of the substrate, up to about 1/2 of the substrate, up to about 3/4 of the substrate, or up to about 99/100 of the substrate. More specifically, the impregnation can be about 1/20 to about 1/2 of the substrate.

As used herein, "radiant barrier material" refers to a substance, that when exposed to radiant energy (e.g., sunlight), will effectively reflect a substantial amount (e.g., up to about 80%, up to about 90%, up to about 95%, or up to about 98%) of the radiant energy and/or will limit or stop a substantial amount (e.g., up to about 80%, up to about 90%, up to about 95%, or up to about 98%) of radiant energy from passing through. The wood-based composite panel, upon being treated with the radiant barrier material, will reflect a substantial amount of the radiant energy and/or will limit or stop a substantial amount of radiant energy from passing through, more so than the wood-based composite panel that is not treated with the radiant barrier material. That wood-based composite panel treated with the radiant barrier material will exhibit satisfactory emissivity levels, in accordance with local, State, or Federal guidelines.

As used herein, a "radiant barrier wood-based composite panel" refers to a wood-based composite panel, as defined herein, that reflects a substantial amount of radiant energy and/or limits or stops a substantial amount of radiant energy from passing through. The amount of radiant energy that is limited, stopped, and/or reflected can be, e.g., up to about 99.9%, up to about 98%, up to about 96%, up to about 95%, up to about 90%, or up to about 88%.

As used herein, "aperture" refers to a hole (e.g., perforation), gap, slit, or other opening or orifice.

As used herein, "emissivity" refers to the ratio of radiation intensity from a surface to the radiation intensity at the same wavelength from a blackbody at the same temperature. The level of emissivity corresponds to the ratio of the amount of radiant energy absorbed to the amount of radiant energy limited, stopped, and/or reflected. As such, a 0.05 level of emissivity corresponds to 5% of the radiant energy being absorbed and 95% of the radiant energy being limited, stopped, and/or reflected.

As used herein, "moisture vapor permeability" refers to the amount of moisture vapor that can pass through a specified amount of substance in a specified period of time, usually expressed in units of $g/hr-m^2$-mm Hg. Specifically, the radiant barrier wood-based substrate of the present invention can have a moisture vapor permeability of up to about 0.025 $g/hr-m^2$-mm Hg, or up to about 0.0005 $g/hr-m^2$-nmm Hg.

As used herein, "metallic foil" refers to one or metals that have been pressed into a sheet or foil.

As used herein, "aluminum foil" refers to a sheet or foil that includes up to about 100% aluminum, up to about 99% aluminum, up to about 98% aluminum, or up to about 90% aluminum.

As used herein, "backing material" refers to a substance that adheres metallic foil to a wood-based substrate. The presence of the backing material is optional. When present, the backing material can include, e.g., webstock such as liner board, kraft paper, or a combination thereof. The backing material can have any suitable thickness and weight, provided the backing material effectively adheres metallic foil to a wood-based substrate over the lifespan of the wood-based substrate. For example, the backing material can have a thickness of up to about 0.25 inches, up to about 0.1 inches, or up to about 0.05 inches. Additionally, the backing material can have a weight, e.g., of at least 35 lbs per square thousand feet, of at least 30 lbs per square thousand feet, of at least 26 lbs per square thousand feet, of at least 25 lbs per square thousand feet, of at least 20 lbs per square thousand feet, of at least 15 lbs per square thousand feet, or of at least 5 lbs per square thousand feet.

As used herein, "fire retardant" refers to a substance that can exhibit an acceptable flame spread and smoke rating (e.g., about 30 or less, about 25 or less, about 20 or less, or about 15 or less). Additionally, it refers to a substance that can show little or no evidence of significant progressive combustion at a relatively long period of time (e.g., about 45 minutes or more, about 60 minutes or more, about 75 minutes or more, or about 90 minutes or more) of exposure to a flame.

As used herein, a "fire retardant radiant barrier wood-based composite panel" refers to a radiant barrier wood-based composite panel, as defined herein, that is fire retardant.

The fire retardant radiant barrier wood-based composite panel will preferably meet the necessary requirements to be certified as a fire retardant wood-based composite panel. In doing so, the fire retardant wood-based composite panel, upon testing, will be approved by the relevant building codes and insurance rating bureaus typically known to those of skill in the art. The fire retardant wood-based composite panel, upon testing, will meet or exceed the requirements of a fire retardant wood-based composite panel, as promulgated by the relevant code sections for one or more of the following entities: Building Officials and Code Administrators International, Inc. (BOCA) National Building Code; Standard Building Code (SBC); Uniform Building Code (UBC); American Society for Testing Materials (ASTM); American Wood-Preservers' Association (AWPA); National Fire Protection Association (NFPA); Underwriters Laboratories, Inc. (UL); U.S. Department of Defense (DOD); Military Specification (Mil); City of Los Angeles, Calif.; City of New York, N.Y. Building Code; International Conference of Building Officials (ICBO); and Southern Building Code Congress International, Inc. (SBCCI).

Specifically, the fire retardant radiant barrier wood-based composite panel can be certified by Underwriters Laboratories (UL); the fire retardant wood-based composite panel can carry an "FRS" rating under UL classification, exhibiting acceptable flame spread and smoke rating (e.g., 25 or less); the fire retardant wood-based composite panel can preferably show little or no evidence of significant progressive combustion at a relatively long period of time (e.g., 60 minutes or more) of exposure to flame; and/or the fire retardant wood-based composite panel can be classified as a Type A fire retardant as defined in AWPA Standards.

Specifically, the fire retardant radiant barrier wood-based composite panel of the present invention can be classified as a wood-based composite panel which, when impregnated with a fire retardant by a pressure process or other means during manufacturing, can have when treated in accordance with ASTM E84, Standard test Method or Surface Burning Characteristics of Building Materials, a flamespread index of 25 or less and can show no evidence of significant progressive combustion when the test is continued for an additional 20 minute period. In addition, the flame front should not progress more than 10.5 feet beyond the center line of the burner at any time during the test.

As used herein, "moisture resistant" refers to a substance that has a relatively low water permeability. Moisture resistant substances will have a relatively low amount of water that can pass through a specified amount of the substance in a specified period of time, usually expressed in units of $g/hr-m^2$-mm Hg. Specifically, the radiant barrier wood-based substrate of the present invention can have a water permeability of up to about 0.025 $g/hr-m^2$-mm Hg, or up to about 0.0005 $g/hr-m^2$-mm Hg.

The radiant barrier wood-based composite panel will preferably meet the necessary requirements to be certified as a radiant barrier wood-based composite panel. In doing so, the radiant barrier wood-based composite panel, upon testing, will be approved by the relevant building codes and insurance rating bureaus typically known to those of skill in the art. The radiant barrier wood-based composite panel, upon testing, will meet or exceed the requirements of a radiant barrier wood-based composite panel, as promulgated by the relevant code sections for one or more of the following entities: Building Officials and Code Administrators International, Inc. (BOCA) National Building Code; Standard Building Code (SBC); Uniform Building Code (UBC); American Society for Testing Materials (ASTM); American Wood-Preservers' Association (AWPA); Underwriters Laboratories, Inc. (UL); U.S. Department of Defense (DOD); Military Specification (Mil); City of Los Angeles, Calif.; City of New York, N.Y. Building Code; International Conference of Building Officials (ICBO); and Southern Building Code Congress International, Inc. (SBCCI).

Referring to FIGS. 1-9, a radiant barrier wood-based composite panel (1) of the present invention is provided. The radiant barrier wood-based composite panel (1) includes a wood-based composite panel (2) having a pair of outer surfaces (21); and a radiant barrier material (10) having a pair of outer surfaces (22), wherein at least a portion of an outer surface of the radiant barrier material (10) is adhered to at least a portion of an outer surface of the wood-based composite panel (2); wherein the radiant barrier material (10) that includes apertures (7) such that the apertures (7) are present in about 49 apertures (7) per square inch of radiant barrier material (10) or less, inclusive.

Radiant Barrier OSB

A radiant barrier oriented strand board can be manufactured by contacting flakes (12) of wood with a first resin (5); orienting, in alternate lengthwise and crosswise layers, the flakes (12) of wood to provide a blanket of oriented flakes (12); contacting the flakes (12) of wood with radiant barrier material (10); and curing the first resin (5) by exposing the first resin (5) to at least one of an elevated temperature, an elevated pressure, and radiant energy; for a sufficient period of time to effectively cure the first resin (5).

Initially, logs pass through a flaker, where they are cut into thin strands (i.e., flakes (12)) of wood. Before the logs pass through a flaker, the logs can optionally be heated, especially if the logs are below about 10° C. (50° F.). The logs can be heated in any suitable manner, provided the physical and chemical integrity of the wood is not compromised. For example, the logs can be heated in a pond of water having a temperature of up to about 80° C. (176° F.), up to about 60° C. (140° F.), or up to about 40° C. (104° F.). Specifically, the logs can be heated in a pond of water having a temperature of about 100° F. (38° C.) to about 110° F. (43° C.). In addition, the logs can be heated for more than about 1 hour. Specifically, the logs can be heated for about 1 hour to about 48 hours. Alternatively, the logs can be heated via microwave for a suitable period of time, effective to dry the logs.

After the logs are cut into thin strands (i.e., flakes) of wood, the flakes (12) can optionally be dried to remove at least some of the water present therein. The flakes (12) can be dried in any suitable manner provided at least some of the water present therein is removed. For example, the flakes (12) can be dried using a tumble dryer. The flakes (12) can be dried under any suitable conditions (e.g., at a temperature of above about 40° C. (104° F.) for about 10 seconds or more), provided at least some of the water present therein is removed. Specifically, the flakes (12) can be dried at about 180° F. to about 300° F. for about 8 minutes to about 10 minutes.

A second resin (3) can optionally be present on at least a portion of a surface of the radiant barrier material (10). The surface of the radiant barrier material (10) that optionally includes the second resin (3) is the surface that contacts the flakes (12) of wood. When the radiant barrier material (10) includes metallic foil (6) and backing material (4), the second resin (3), when present, will be located on the backing material (4) side of the radiant barrier material (10). This second resin (3), when present, assists in adhering the radiant barrier material (10) to the flakes (12) of wood. As such, upon exposure to the elevated temperature, elevated pressure, and/or radiant energy, the second resin (3) will cure, thereby adhering the radiant barrier material (10) to the flakes (12) of wood.

When the radiant barrier material (10) includes metallic foil (6) and backing material (4), they can optionally be adhered to one another with a third resin (8). As such, the third resin (8), when present, can be located between the metallic foil (6) and backing material (4). The third resin (8), when present, assists in adhering the metallic foil (6) to the backing material (4).

Radiant Barrier Plywood

A radiant barrier plywood can be manufactured by contacting veneers (13) of wood with a first resin (5); stacking the of veneers (13) of wood to form a stack of veneers (13); contacting the stack of veneers (13) with a radiant barrier material (10); and curing the first resin (5) by exposing the first resin (5) to at least one of an elevated temperature, an elevated pressure, and radiant energy; for a sufficient period of time to effectively cure the first resin (5).

Alternatively, a radiant barrier plywood can be manufactured by contacting veneers (13) of wood with a first resin (5); stacking the of veneers (13) of wood to form a stack of veneers (13); and curing the first resin (5) by exposing the first resin (5) to at least one of an elevated temperature, an elevated pressure, and radiant energy; for a sufficient period of time to effectively cure the first resin (5). The radiant barrier material (10) can then be adhered to the plywood.

Initially, the logs are debarked and then placed in a hot water vault for about 8 to about 24 hours. The logs are then placed in a lathe, where a spindle knife cuts the logs into veneers (13) of wood. The veneers (13) are clipped in pieces about 8 feet or less in width. The clipped pieces are manually sorted into face sheets, filler sheets, and core sheets. These green veneers (13) are optionally stored or directly placed into a dryer for a suitable period of time to remove at least some of the water present therein. The dried veneers (13) are either stored or used directly in the mill. The dried veneers (13) are contacted with a first resin (5) and then oriented in alternate lengthwise and crosswise layers on a sheet or screen to form a stack of oriented veneers (13) of wood. The stack of oriented veneers (13) can be contacted with a radiant barrier material (10) and pressed (e.g., heated under pressure to compress the stack to a suitable thickness). Alternatively, the stack of oriented veneers (13) can be pressed (e.g., heated under pressure to compress the stack to a suitable thickness) and the radiant barrier material (10) can then be adhered to the plywood.

Specifically, the veneers (13) can be contacted with the radiant barrier material (10) off line. More specifically, after to drying the veneers (13) and before curing the first resin (5), the veneers (13) can be contacted with the radiant barrier material (10) off line. Alternatively, after curing the first resin (5), the veneers (13) can be contacted with the radiant barrier material (10) off line.

A radiant barrier plywood can be manufactured by contacting veneers (13) of wood with a resin; stacking the of veneers (13) of wood to form a stack; and curing the resin by exposing the resin to at least one of an elevated temperature, an elevated pressure, and radiant energy; for a sufficient period of time to effectively cure the resin; wherein the face veneers (13) of wood are independently contacted with the radiant barrier material (10) at any suitable step.

A second resin (3) can optionally be present on at least a portion of a surface of the radiant barrier material (10). The surface of the radiant barrier material (10) that optionally includes the second resin (3) is the surface that contacts the veneer(s) of wood. When the radiant barrier material (10) includes metallic foil (6) and backing material (4), the second resin (3), when present, will be located on the backing material (4) side of the radiant barrier material (10). This second resin (3), when present, assists in adhering the radiant barrier material (10) to the veneer(s) of wood. As such, upon exposure to the elevated temperature, elevated pressure, and/or radiant energy, the second resin (3) will cure, thereby adhering the radiant barrier material (10) to the veneer(s) of wood.

When the radiant barrier material (10) includes metallic foil (6) and backing material (4), they can optionally be adhered to one another with a third resin (8). As such, the third resin (8), when present, can be located between the metallic foil (6) and backing material (4). The third resin (8), when present, assists in adhering the metallic foil (6) to the backing material (4).

Species of Timber

Any suitable species of timber (i.e., wood) can be employed to make the radiant barrier OSB or the radiant barrier plywood. In addition, the radiant barrier OSB or the radiant barrier plywood can be manufactured from one or more suitable species of timber. Suitable types of timber include, e.g., Western, Northern (and Appalachian), and Southern timber.

Suitable Western timbers include, e.g., Incense-Cedar, Port-Orford-Cedar, Douglas Fir, White Fir, Western Hemlock, Western Larch, Lodgepole Pine, Ponderosa Pine, Sugar Pine, Western White Pine, Western Redcedar, Redwood, Engelmann Spruce, Sitka Spruce, Yellow-Cedar, Red Alder, Oregon Ash, Aspen, Black Cottonwood, California Black Oak, Oregon White Oak, Big Leaf Maple, Paper Birch, and Tanoak.

Suitable Northern (and Appalachian) timbers include, e.g., Northern White Cedar, Balsam Fir, Eastern Hemlock, Fraser Fir, Jack Pine, Red Pine, Eastern White Pine, Eastern Red Cedar, Eastern Spruce, Tamarack, Ash, Aspen, Basswood, Buckeye, Butternut, American Beech, Birch, Black Cherry, American Chestnut, Cottonwood, Elm, Hack Berry, True Hickory, Honey Locust, Black Locust, Hard maple, Soft Maple, Red Oak, White Oak, American Sycamore, Black Walnut, and Yellow-Poplar.

Suitable Southern timbers include, e.g., Atlantic White Cedar, Bald Cypress, Fraser Fir, Southern Pine, Eastern Red Cedar, Ash, Basswood, Arnecan, Beech, Butternut, Cottonwood, Elm, Hackberry, Pecan Hickory, True Hickory, Honey Locust, Black Locust, Magnolia, Soft Maple, Red Oaks, Sassafras, Sweetgum, American Sycamore, Tupelo, Black Walnut, Black Willow, and Yellow Poplar.

First Resins

As described herein, the flakes (12) or veneers (13) are contacted with a first resin (5). The flakes (12) or veneer are subsequently cured to mechanically and chemically bind the first resin (5) to the flakes (12) or veneers (13). Such curing can typically be accomplished by exposing the first resin (5) and flakes (12) or the first resin (5) and veneers (13) to elevated temperatures, elevated pressures, and/or radiant energy (e.g., UV, electron beam, microwave, beta radiation, gamma radiation, neutron beam, proton beam, infra red, etc.) for a sufficient period of time to effectively cure the first resin (5). Upon curing, the first resin (5) can impregnate the flakes (12) or the veneers (13), or the first resin (5) can remain on the outer surface of the flakes (12) or the veneers (13). The curing provides an OSB or plywood wherein the first resin (5) is mechanically and chemically bound to the flakes (12) or the veneers (13). The chemical bonding results in the formation of chemical linkages between the first resin (5) and the cellulose and hemicellulose in the flakes (12) or the veneers (13). Such curing of the first resin (5), therefore, effectively provides for the underlying wood-based substrate.

The first resin (5) (i.e., adhesive polymer) can either be a thermoplastic polymer or a thermosetting polymer. Thermoplastic polymers are long-chain polymers that soften and flow on heating, then harden again by cooling. They generally have less resistance to heat, moisture, and long-term static loading than do thermosetting polymers. Common wood adhesives that are based on thermoplastic polymers include, e.g., polyvinyl acetate emulsions, elastomerics, contacts, and hot-melts. Alternatively, thermosetting polymers undergo irreversible chemical change, and on reheating, they do not soften and flow again. They form cross-linked polymers that have strength, have resistance to moisture and other chemicals, and are rigid enough to support high, long-term static loads without deforming. Suitable first resins (5) that are based on thermosetting polymers include, e.g., phenolic, resorcinolic, melamine, isocyanate, urea, and epoxy.

The suitable first resin (5) can be of natural origin, can be of synthetic origin, or can include first resins (5) of a combination thereof. Suitable resins of natural origin include, e.g., animal protein, blood protein, casein protein, soybean protein, lignocellulostic residue and extracts, bark-based resins, and combinations thereof. Suitable resins of synthetic origin include, e.g., cross-linkable polyvinyl acetate emulsion, elastomeric contact, elastomeric mastic, emulsion polymer/isocyanate, epoxy, hot melt, isocyanate, formaldehyde, melamine and melamine urea, phenolic, polyvinyl acetate emulsion, polyurethane, resorcinol and phenol resorcinol, urea, and combinations thereof. In one embodiment of the present invention, the first resin (5) can be a foaming adhesive, such as dry cow blood.

Specifically, the first resin (5) can include an isocyanate resin, a melamine resin, a phenol-formaldehyde (PF) resin, a melamine-formaldehyde (MF) resin, a phenol-melamine-formaldehyde (PMF) resin, a melamine-urea-formaldehyde (MUF) resin, a phenol-melamine-urea-formaldehyde (PMUF) resin, or a combination thereof. More specifically, the first resin (5) can be a melamine resin, e.g., phenol-melamine-formaldehyde (PMF) resin which is commercially available from ARC Resins Corporation (Longueuil, Quebec, Canada), Borden Chemical Inc. (Columbus, Ohio), GP Resin (Atlanta, Ga.) or Dynea (Austria). PMF Resin is a phenol-melamine-formaldehyde copolymer.

Any suitable isocyanate can be employed as the first resin (5). Suitable isocyanates include, e.g., PMDI (polymethylenedipenyl-4,4'-diisocyanate); MDI (methylene diphenyl diisocyanate), or a combination thereof. Additional suitable isocayantes are disclosed, e.g., in Aldrich Catalogue (Milwaukee, Wis.).

The phenol can optionally be substituted. Suitable substituted phenols include, e.g., alkyl substituted phenols, aryl substituted phenols, cycloalkyl substituted phenols, alkenyl substituted phenols, alkoxy substituted phenols, aryloxy substituted phenols, and halogen substituted phenols, as disclosed in U.S. Pat. No. 5,700,587. Additional suitable substituted phenols are disclosed, e.g., in U.S. Pat. No. 6,132,549.

The formaldehyde can optionally be replaced with another suitable aldehyde. Suitable aldehydes include, e.g., formaldehyde, acetaldehyde, propionaldehyde, furfuraldehyde and benzaldehyde. In general, the aldehyde employed can have the formula R'CHO wherein R' is a hydrogen or a hydrocarbon radical of 1 to about 12 carbon atoms. Specifically, the aldehyde can be formaldehyde. Suitable additional aldehydes are disclosed, e.g., in U.S. Pat. No. 5,700,587 and Aldrich Catalogue (Milwaukee, Wis.).

The first resin (5) can be a solid (e.g., powder) or a liquid. If the first resin (5) is a liquid, the liquid resin can be relatively viscous or relatively non-viscous. If the first resin (5) is a liquid and is relatively viscous, the first resin (5) can optionally be diluted with one or more carriers to render the first resin (5) relatively non-viscous. Suitable carriers include, e.g., water, organic hydrocarbons, or a combination thereof.

Additional suitable first resins (5) can be found, e.g., in the *Handbook of Thermoset Plastics; Wood Handbook*, sections 9-16, 9-9, 10-3, and 10-4; *Forest Products Society Publications* (http://www.forestprod.org); *Wood Adhesives 2000*, extended abstracts cat. No. 7260; *International Contributions to Wood Adhesion Research*, cat. No. 7267; *Wood Adhesives* 1999, cat. No. 7296; 1998 *Resin Binding Seminar Proceedings*, cat. No. 7266; *Handbook of Pressure Sensitive Adhesive Technology*, 3rd Edition by Donatas Satas, Hardcover; *Handbook of Adhesive Technology*, by A. Pizzi, K. L. Mittal, Hardcover; *Resin Transfer Moulding*, by Kevin Potter, Hardcover; and *Cyanoacrylate Resins: The Instant Adhesives*, by Henry L. Lee, Paperback, T/C Press, January 1986; and references cited therein.

Additional suitable first resins (5) can be found, e.g., in U.S. Pat. Nos. 6,136,408; 6,132,549; 4,758,478; 5,700,587; 5,635,118; 5,714,099; 4,364,984; 4,407,999; 4,514,532; 5,425,908; 5,552,095; 5,554,429; 5,861,119; 5,951,795; 5,974,760; 6,028,133; 6,132,885; and references cite therein.

In one specific embodiment of the present invention, the first resin (5) can include a polyolefin (e.g., polyethylene, polypropylene, or a combination thereof), alone or in combination with poly vinylacetate (PVA).

Some suitable first resins (5) are commercially available from, e.g., Borden Chemical Inc. (Columbus, Ohio) and ARC Resins Corporation (Longueuil, Canada).

The first resin (5) can be cured, e.g., under a suitable pressure and temperature for a sufficient period of time effective to cure the first resin (5). The length of time will typically depend upon the desired thickness of the OSB or the plywood. The length of time can be up to about 1 minute, up to about 2 minutes, up to about 3 minutes, up to about 4 minutes, up to about 5 minutes, or up to about 10 minutes. Typically, the length of time can be about 3.5 minutes to about 7.5 minutes. For example, for $3/8$ inch (9.52 mm) OSB, the length of time can be about 230 seconds to about 240 seconds, for $7/16$ inch (11.11 mm) OSB, the length of time can be about 230 seconds to about 240 seconds, for $15/32$ inch (11.9 mm) OSB, the length of time can be about 260 seconds to about 270 seconds, for inch (12.7 mm) OSB, the length of time can be about 280 seconds to about 290 seconds, for $5/8$ inch (15.88 mm) OSB, the length of time can be about 360 seconds to about 370 seconds, and for $3/4$ inch (19 mm) OSB, the length of time can be about 420 seconds to about 440 seconds.

The first resin (5), upon curing, will preferably impart water-resistance and weather resistance upon the OSB or the plywood. The first resin (5) typically employed, prior to curing, will typically not undergo chemical or physical decomposition, to any appreciable degree, such that the first resin (5) will not cure. Additionally, first resin (5) typically employed, after curing, will remain stable throughout the subsequent OSB or plywood process step(s).

The first resin (5) may require the presence of a catalyst and/or accelerator to cure the first resin (5). Any suitable catalyst and/or accelerator can be employed, provided the first resin (5) effectively cures in a suitable period of time and the first resin (5), upon curing, remains chemically and physically stable. Suitable catalysts include acid catalysts (e.g., formic acid), base catalysts (e.g., sodium hydroxide, calcium hydroxide, potassium hydroxide, or soda ash), salt catalysts, peroxide catalysts, and sulfur compounds. Additionally, the first resin (5) can optionally include hardeners (e.g., amine hardeners added to epoxy and formaldehyde hardener added to resorcinol) to produce cross-linking reactions to solidify the first resin (5); antioxidants; acid scavengers; preservatives; wetting agents; defoamers; plasticizers; thickeners; and/or colorants. See, e.g., U.S. Pat. Nos. 6,132,549; 5,498,647; 5,700,587; 4,514,532; and 4,758,478.

The first resin (5), prior to or upon curing, can impregnate the flake or the veneer. Specifically, the first resin (5), prior to or upon curing, can completely impregnate the flake or the veneer (i.e., the resin is completely embedded in the flake or the veneer). Alternatively, the first resin (5), prior to or upon curing, can partially impregnate the flake or the veneer. Specifically, the first resin (5), prior to or upon curing, can impregnate up to about $1/100$ of the flake, up to about $1/50$ of the flake, up to about $1/10$ of the flake or the veneer, up to about $1/4$ of the flake or the veneer, up to about 1 of the flake or the veneer, up to about $3/4$ of the flake or the veneer, or up to about $99/100$ of the flake or the veneer. More specifically, the first resin (5), prior to or upon curing, can impregnate about $1/20$ to about 1 of the flake or the veneer.

Step(s) in which First Resin can be Added to Flakes

The flakes (12) of wood can be contacted with the first resin (5) at any suitable step to provide a radiant barrier wood-based composite panel (1), provided: the first resin (5) effectively cures during the pressing of the blanket of oriented flakes (12); and the first resin (5) retains its adhesiveness over the extended periods of time typically encountered with the lifespan of the radiant barrier wood-based composite panel (1). The lifespan can be, e.g., up to about 25 years, up to about 50 years, or up to about 100 years.

Figure 2:
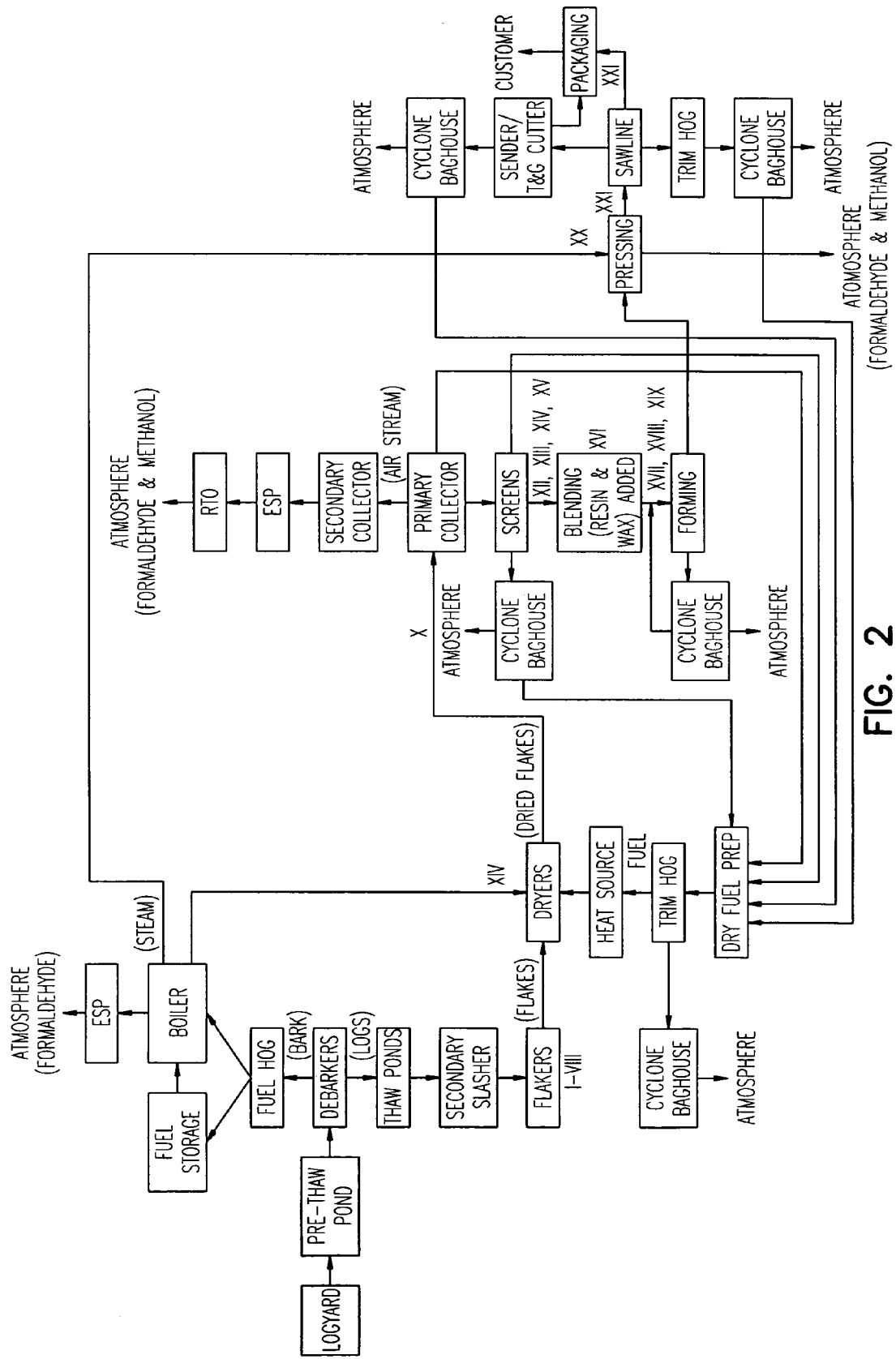
FIG. 2 illustrates a process flow of the radiant barrier oriented strand board (OSB) of the present invention wherein suitable locations and methods in which the resin can be introduced and applied to the flakes are shown in Roman numerals, which correspond to Tables I-II.
Figure 3:
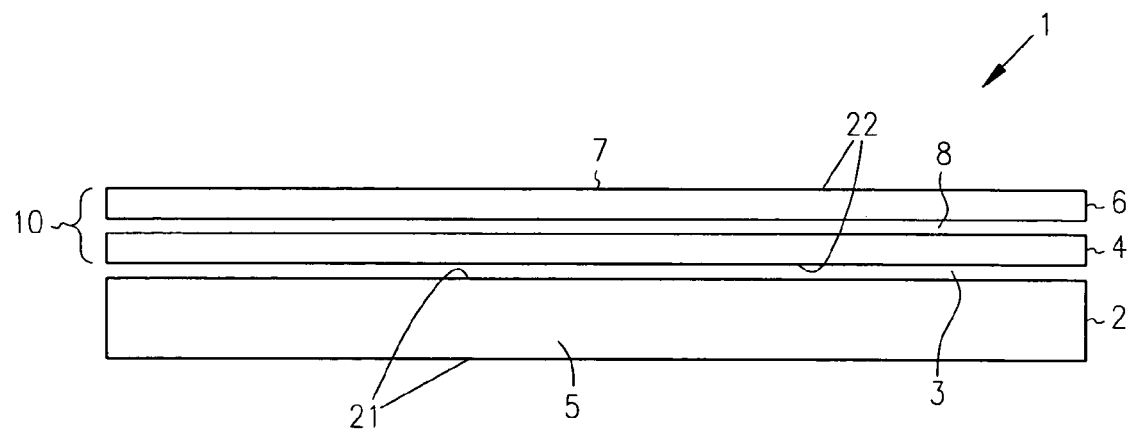
FIG. 3 illustrates a cross-sectional view of a radiant barrier wood-based substrate of the present invention.
Figure 4:
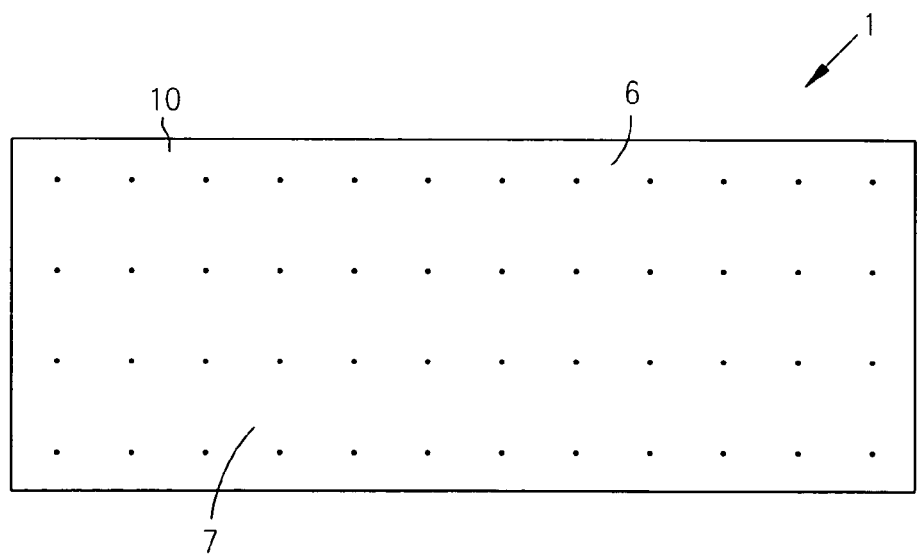
FIG. 4 illustrates a top view of a radiant barrier wood-based substrate of the present invention.
Figure 5:
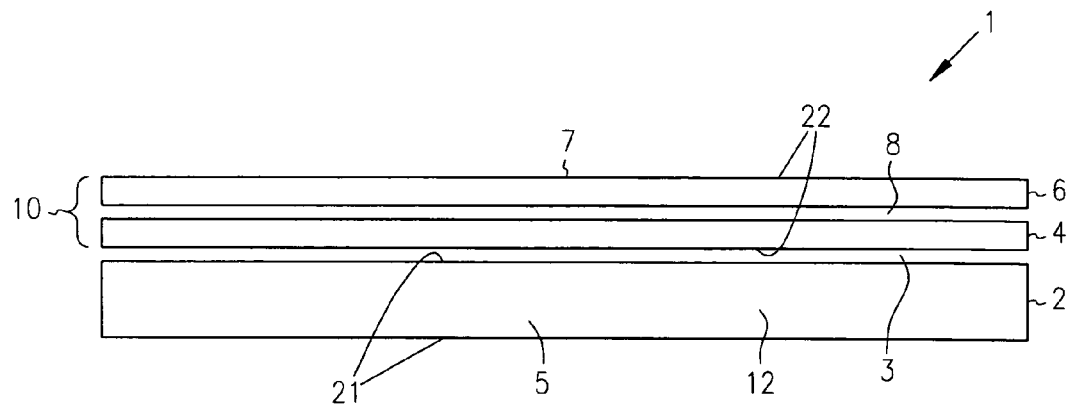
FIG. 5 illustrates a cross-sectional view of a radiant barrier oriented strand board of the present invention.
Figure 6:
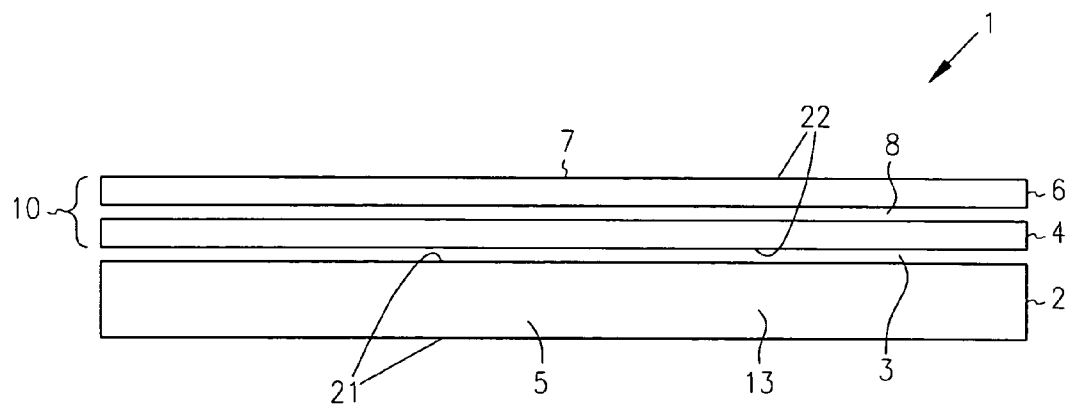
FIG. 6 illustrates a cross-sectional view of a radiant barrier plywood of the present invention.
Figure 7:
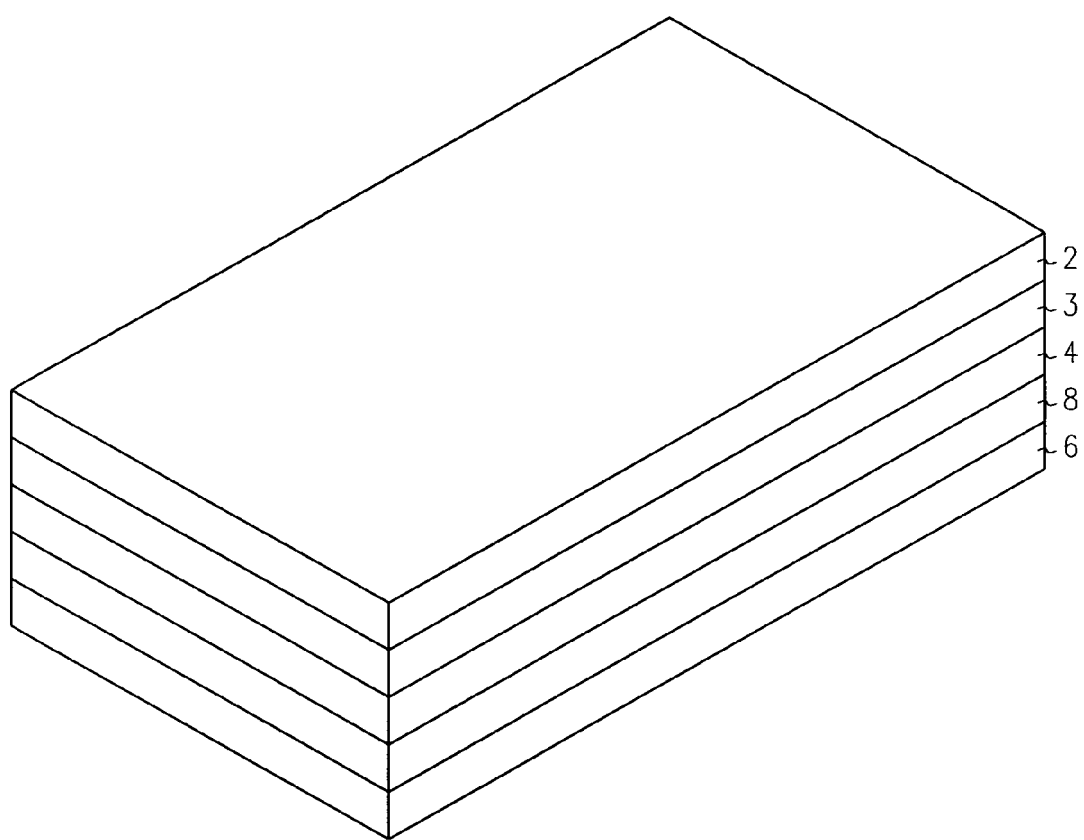
FIG. 7 illustrates a radiant barrier wood-based substrate of the present invention.
Figure 8:
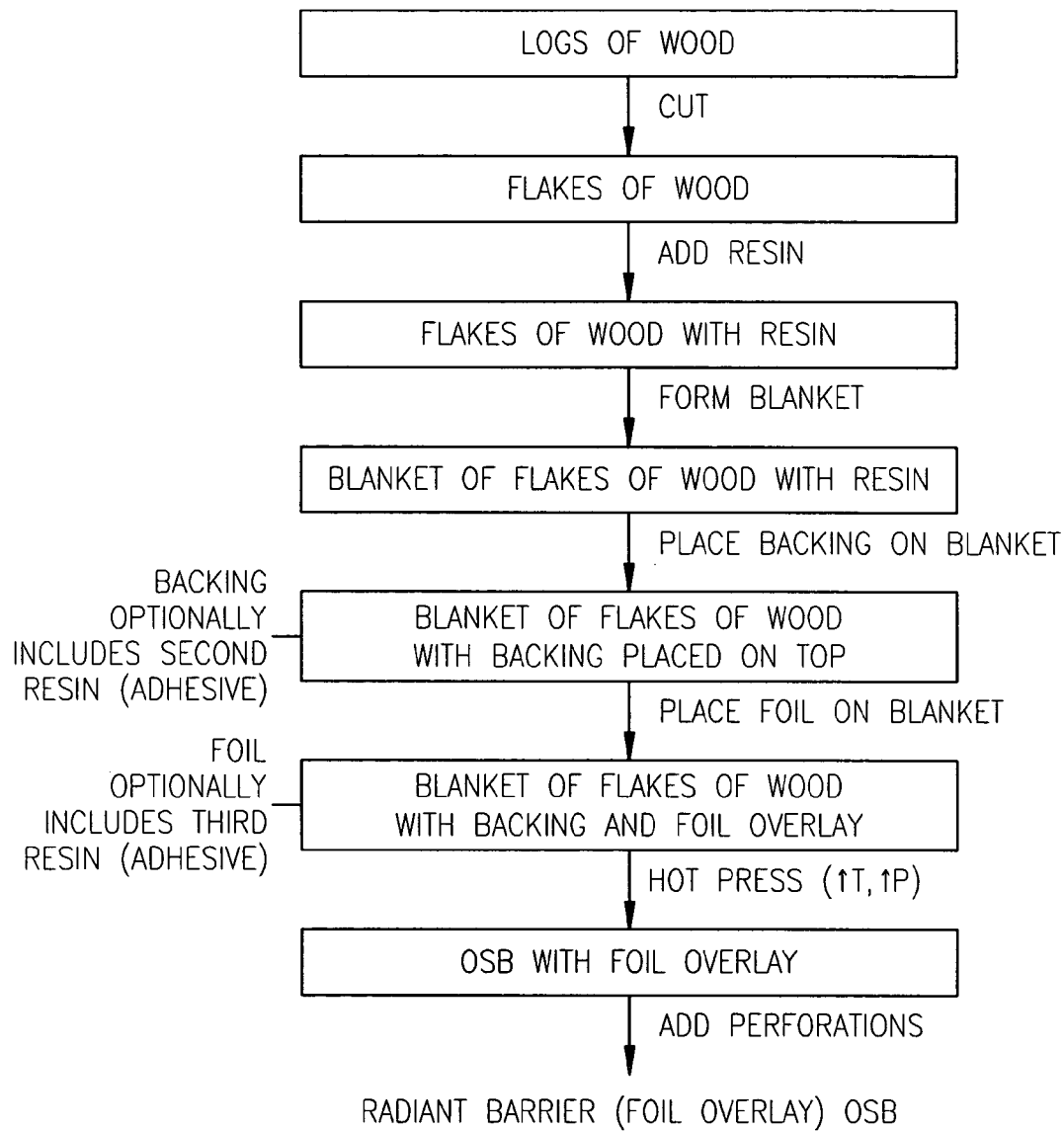
FIG. 8 illustrates process flow of the radiant barrier oriented strand board (OSB) of the present invention.
Figure 9:
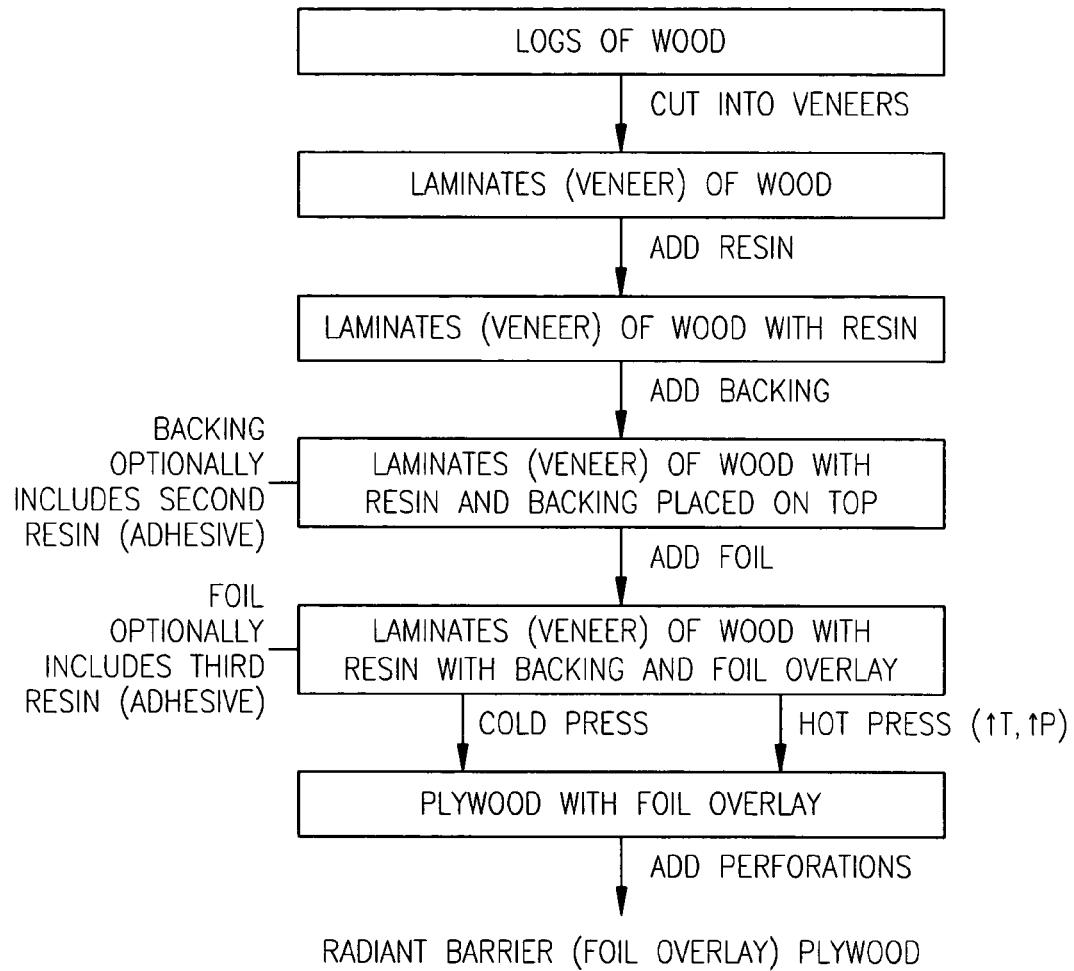
FIG. 9 illustrates a process flow of the radiant barrier plywood of the present invention.

As disclosed in Tables I and II and FIGS. 1-2, the flakes (12) of wood can be contacted with the first resin (5) at any suitable step to provide a radiant barrier wood-based composite panel (1), provided: the first resin (5) effectively cures during the pressing of the blanket of oriented flakes (12); and the resin retains its adhesiveness over the extended periods of time typically encountered with the lifespan of the radiant barrier wood-based composite panel (1). The lifespan can be, e.g., to about 10 years, up to about 25 years, up to about 50 years, or up to about 100 years).

Specifically, the flakes (12) of wood can be contacted with the first resin (5) after the flakes (12) of wood are dried and before the flakes (12) of wood are pressed.

Specifically, as disclosed in Tables I and II and FIGS. 1-2, the flakes (12) of wood can be contacted with the first resin (5) at a flaker outfeed, on a flake conveyor belt, at a drop-out to green bins (pantlegs), at an entry to green bins, on the inside of a green bins, at a green bin outfeed (drop chute), at a screw auger pan to dryer, at a airlock separation, at a dryer infeed, at a $1^{st}$ pass of 3 pass dryer, at a dryer outfeed, at a primary cyclone, at an airlock separation, at a reversing conveyor to dry bin or fire dump or conveyor to screens, at an inside dry bins, at a dry bin conveyor, at a scales, on a conveyor, inside a blender, at a forming line heads, at a forming line, at a caul plate or screen, at a steam injection in press, or any combination thereof.

Specifically, as disclosed in Tables I and II and FIGS. 1-2, the flakes (12) of wood can be contacted with the first resin (5) inside the blender.

Method(s) to Apply the First Resin to Flakes

The first resin (5) can be applied to the flakes (12) in any suitable manner, provided: the first resin (5) effectively cures during the pressing of oriented flakes (12) (i.e., pressing stage); and the first resin (5) retains its adhesiveness over the extended periods of time typically encountered with the lifespan of the radiant barrier wood-based composite panel (1). The lifespan can be, e.g., up to about 25 years, up to about 50 years, or up to about 100 years.

Specifically, Tables I-II and FIGS. 1-2 illustrate suitable methods in which the flakes (12) can be contacted with the first resin (5). These suitable methods include, e.g., spraying, rolling, laminating, pressure injecting, dipping, and/or injecting the flakes (12) with the first resin (5). Specifically, the flakes (12) can be contacted with the first resin (5) by spraying the flakes (12) with the first resin (5).

Specifically, the flake of wood can be contacted with the first resin (5) by spraying the first resin (5) onto the flakes (12) of wood. More specifically, the flake of wood can be contacted with the first resin (5) by dry spraying the powdered first resin (5) onto the flakes (12) of wood.

The following table illustrates possible locations and methods in which the first resin (5) can be introduced and applied to the flakes (12) of wood, wherein the locations are shown in the accompanying figures herein below.

TABLE I

| Id. | Materials Handling Process-Generic | Application Location | Comments |
|---|---|---|---|
| I. | Flaker to Convey system | Flaker Outfeed | |
| II. | Convey to Green Bins | Flake Conveyor belt | |
| III. | Convey to Green Bins | Drop-out to Green Bins (Pantlegs) | |
| IV. | Convey to Green Bins | Entry to Green Bins | |
| V. | Green Bin | Inside Green Bins | Head end before doffing rolls |
| VI. | Green Bin to Dryer | Green Bin Outfeed (drop chute) | |
| VII. | Green Bin to Dryer | Screw auger pan to dryer | |
| | Airlock Separation | Airlock Separation | Flakes are clumped and compressed |
| VIII. | Convey to Dryer | Dryer infeed | |
| IX. | Inside Dryer | 1st Pass of 3 pass dryer | Could also be inside conveyor dryer |
| X. | Convey to Product Separator (Primary Cyclone) | Dryer Outfeed | Nozzles in dryer outfeed |
| XI. | Product Separator Airlock Separation | Primary Cyclone Airlock Separation | |
| XII. | Convey to Screens and Dry Bins | Reversing Conveyor to Dry Bin or Fire Dump or Conveyor to Screens | |
| XIII. | Dry Bin | Inside Dry Bins | Head end before doffing rolls |
| XIV. | Convey to scales Scales | Dry bin conveyor Scales | |
| XV. | Convey to Blender | On conveyor | Dry Chemical and/or Resin - Together or separately |
| XVI. | Blender | Inside Blender | Dry Chemical, Liquid Resin Liquid Chemical, Liquid Resin Dry Chemical, Dry Resin Liquid Chemical, Dry Resin |
| XVII. | Forming Heads | Forming Line Heads | Applying in forming head bins |
| XVIII. | Forming | Forming Line | Spray on dry flake mat |

The following table illustrates additional possible locations and methods in which the first resin (5) can be introduced and applied to the flakes (12) of wood. The locations are shown in the accompanying figures herein below.

TABLE II

| Id. | Materials Handling Process-Generic | Application Location | Comments |
|---|---|---|---|
| XIX. | Convey | New Option: Pneumatic Conveyor | From Flaker to Green Bin - spray nozzles in pneumatic pipe |
| XX. | Green Flake Blender | Somewhere between 1 and 5, or at 6 and 7, or 8 | Could be off-line operation, or integrated into line |
| XXI. | Pre-dry (flake) Operation | After flaker, re-introduce to Green Bin or Dryer | Could be off-line operation or integrated into line |
| XXII. | Pre-Dry (flake) Operation | New Equip Options: Radio Frequency Microwave Rotary Dryer Conveyor Dryer Fluidized Bed Low Headspace Drying | |
| XXIII. | Pre-Dry or Dry | Conventional Line drying Options: Rotary Triple Pass Conveyor New Equipment: Single Pass Dryer Single Pass combination Blender/Dryer | |
| XXIV. | Pre-Compression | Pre-compression roller | |
| XXV. | Separate Operation | On Conventional OSB | Similar to conventional post-production treating Spray Spread Dip Pressure Treat (Retort) Pressure Inject Laminate |

Step(s) in which First Resin can be Added to Veneers

The veneers (13) of wood can be contacted with the first resin (5) at any suitable step to provide a radiant barrier wood-based composite panel (1), provided: the first resin (5) effectively cures during the pressing of the stack of veneers (13); and the first resin (5) retains its adhesiveness over the extended periods of time typically encountered with the lifespan of the radiant barrier wood-based composite panel (1). The lifespan can be, e.g., up to about 25 years, up to about 50 years, or up to about 100 years.

Specifically, the veneers (13) of wood can be contacted with the first resin (5) after the veneers (13) of wood are dried and before the stack of veneers (13) of wood are pressed.

Method(s) to Apply First Resin to Veneers

The first resin (5) can be applied to the veneers (13) in any suitable manner, provided: the first resin (5) effectively cures during the pressing of stack of veneers (13) (i.e., pressing stage); and the first resin (5) retains its adhesiveness over the extended periods of time typically encountered with the lifespan of the radiant barrier wood-based composite panel (1). The lifespan can be, e.g., up to about 25 years, up to about 50 years, or up to about 100 years.

Suitable methods in which the veneers (13) can be contacted with the first resin (5) include, e.g., spraying, rolling, laminating, pressure injecting, dipping, curtain coating, foam application, and/or injecting the veneers (13) with the first resin (5). Specifically, the veneers (13) can be contacted with the first resin (5) by spraying the veneers (13) with the first resin (5).

Specifically, the veneers (13) of wood can be contacted with the first resin (5) by spraying the first resin (5) onto the veneers (13) of wood. More specifically, the veneers (13) of wood can be contacted with the first resin (5) by dry spraying the powdered first resin (5) onto the veneers (13) of wood.

Radiant Barrier Material

The radiant barrier material (10) will include metallic material and optionally a backing material (4) or backing. When present, the backing material (4) will be affixed (e.g., adhered) to the wood-based composite panel (2) with a second resin (3). Additionally, when present, the backing material (4) will be affixed (e.g., adhered) to the metallic material with a third resin (8).

Second Resin

The radiant barrier material (10) can be adhered to the outer surface of the wood-based composite panel (2) employing a second resin (3). Any suitable second resin (3) can be employed provided: the second resin (3) effectively cures during the pressing stage; and the second resin (3) retains its adhesiveness over the extended periods of time typically encountered with the lifespan of the radiant barrier wood-based composite panel (1). The lifespan can be, e.g., up to about 25 years, up to about 50 years, or up to about 100 years.

The second resin (3) can be of natural origin, can be of synthetic origin, or can include a combination thereof. Suitable resins of natural origin include, e.g., animal protein, blood protein, casein protein, soybean protein, lignocellulostic residue and extracts, bark-based resins, and combinations thereof. Suitable resins of synthetic origin include, e.g., cross-linkable polyvinyl acetate emulsion, elastomeric contact, elastomeric mastic, emulsion polymer/isocyanate, epoxy, hot melt, isocyanate, formaldehyde, melamine and melamine urea, phenolic, polyvinyl acetate emulsion, polyurethane, resorcinol and phenol resorcinol, urea, and combinations thereof.

Specifically, the second resin (3) (i.e., adhesive polymer) can either be a thermoplastic polymer or a thermosetting polymer. In one embodiment of the present invention, the second adhesive is a thermosetting polymer. One particularly suitable thermosetting polymer useful as a second adhesive is a polyolefin resin (e.g., polyethylene resin) that is commercially available from, e.g., Exxon Mobil Corp. (Houston, Tex.), Dow Chemical Corp. (Midland, Mich.), or HB Fuller (St. Paul, Minn.).

The second resin (3) can be a solid (e.g., powder) or a liquid. If the second resin (3) is a liquid, the liquid resin can be relatively viscous or relatively non-viscous. If the second resin (3) is a liquid and is relatively viscous, the second resin (3) can optionally be diluted with one or more carriers to render the second resin (3) relatively non-viscous. Suitable carriers include, e.g., water, organic hydrocarbons, or a combination thereof.

Additional suitable second resin (3)s can be found, e.g., in the *Handbook of Thermoset Plastics; Wood Handbook*, sections 9-16, 9-9, 10-3, and 10-4; *Forest Products Society Publications* (http://www.forestprod.org); *Wood Adhesives 2000*, extended abstracts cat. No. 7260; *International Contributions to Wood Adhesion Research*, cat. No. 7267; *Wood Adhesives 1999*, cat. No. 7296; 1998 *Resin Binding Seminar Proceedings*, cat. No. 7266; *Handbook of Pressure Sensitive Adhesive Technology*, 3rd Edition by Donatas Satas, Hardcover; *Handbook of Adhesive Technology*, by A. Pizzi, K. L. Mittal, Hardcover; *Resin Transfer Moulding*, by Kevin Potter, Hardcover; and *Cyanoacrylate Resins: The Instant Adhesives*, by Henry L. Lee, Paperback, T/C Press, January 1986; and references cited therein.

Additional suitable second resin (3)s can be found, e.g., in U.S. Pat. Nos. 6,136,408; 6,132,549; 4,758,478; 5,700,587; 5,635,118; 5,714,099; 4,364,984; 4,407,999; 4,514,532; 5,425,908; 5,552,095; 5,554,429; 5,861,119; 5,951,795; 5,974,760; 6,028,133; 6,132,885; and references cite therein.

The second resin (3) can be cured, e.g., under a suitable pressure and temperature for a sufficient period of time effective to cure the second resin (3). The second resin (3), upon curing, will preferably impart water-resistance and weather resistance upon the OSB or the plywood. The second resin (3) typically employed, prior to curing, will typically not undergo chemical or physical decomposition, to any appreciable degree, such that the second resin (3) will not cure. Additionally, the second resin (3) typically employed, after curing, will remain stable throughout the subsequent OSB or plywood process step(s).

Third Resin

The metallic foil (6) can be adhered to the backing material (4) employing a third resin (8). Any suitable third resin (8) can be employed provided the third resin (8) retains its adhesiveness over the extended periods of time typically encountered with the lifespan of the radiant barrier wood-based composite panel (1). The lifespan can be, e.g., up to about 25 years, up to about 50 years, or up to about 100 years.

The third resin (8) can be of natural origin, can be of synthetic origin, or can include third resin (8)s of a combination thereof. Suitable resins of natural origin include, e.g., animal protein, blood protein, casein protein, soybean protein, lignocellulostic residue and extracts, bark-based resins, and combinations thereof. Suitable resins of synthetic origin include, e.g., cross-linkable polyvinyl acetate emulsion, elastomeric contact, elastomeric mastic, emulsion polymer/isocyanate, epoxy, hot melt, isocyanate, formaldehyde, melamine and melamine urea, phenolic, polyvinyl acetate emulsion, polyurethane, resorcinol and phenol resorcinol, urea, and combinations thereof.

Specifically, the third resin (8) (i.e., adhesive polymer) can be a polyvinyl acetate polymer which is commercially available from, e.g., Borden Chemical Inc. (Columbus, Ohio), GP Resin (Atlanta, Ga.), or Dow Chemical Corp. (Midland, Mich.).

The third resin (8) can be a solid (e.g., powder) or a liquid. If the third resin (8) is a liquid, the liquid resin can be relatively viscous or relatively non-viscous. If the third resin (8) is a liquid and is relatively viscous, the third resin (8) can optionally be diluted with one or more carriers to render the third resin (8) relatively non-viscous. Suitable carriers include, e.g., water, organic hydrocarbons, or a combination thereof.

Additional suitable third resins (8) can be found, e.g., in the *Handbook of Thermoset Plastics; Wood Handbook*, sections 9-16, 9-9, 10-3, and 10-4; *Forest Products Society Publications* (http://www.forestprod.org); *Wood Adhesives*

2000, extended abstracts cat. No. 7260; *International Contributions to Wood Adhesion Research*, cat. No. 7267; *Wood Adhesives* 1999, cat. No. 7296; 1998 *Resin Binding Seminar Proceedings*, cat. No. 7266; *Handbook of Pressure Sensitive Adhesive Technology*, 3rd Edition by Donatas Satas, Hardcover; *Handbook of Adhesive Technology*, by A. Pizzi, K. L. Mittal, Hardcover; *Resin Transfer Moulding*, by Kevin Potter, Hardcover; and *Cyanoacrylate Resins: The Instant Adhesives*, by Henry L. Lee, Paperback, T/C Press, January 1986; and references cited therein.

Additional suitable third resins (8) can be found, e.g., in U.S. Pat. Nos. 6,136,408; 6,132,549; 4,758,478; 5,700,587; 5,635,118; 5,714,099; 4,364,984; 4,407,999; 4,514,532; 5,425,908; 5,552,095; 5,554,429; 5,861,119; 5,951,795; 5,974,760; 6,028,133; 6,132,885; and references cite therein.

In one specific embodiment of the present invention, the third resin (8) can include a polyolefin (e.g., polyethylene, polypropylene, or a combination thereof), alone or in combination with poly vinylacetate (PVA).

Backing Material

A suitable backing material (4) can be employed to adhere the metallic foil (6) to the wood-based composite panel (2). As such, the metallic foil (6) is adhered to the backing material (4), which is adhered to the wood-based composite panel (2). Any suitable backing can be employed, provided: the backing adheres to the wood-based composite panel (2) over the extended periods of time typically encountered with the lifespan of the wood-based composite panel (2); the metallic foil (6) adheres to the backing material (4) over the extended periods of time typically encountered with the lifespan of the wood-based composite panel (2); and the backing material (4) remains intact during the manufacturing process.

The backing material (4) can include: a flexible porous sheet of water soluble or water insoluble material; water soluble or water insoluble polymeric fibers; a porous film; a matrix with spaces within the matrix; nonwoven fabric of polymeric or natural fibers such as polyester, cotton or cellulose fibers optionally bonded together with a sizing resin; a woven or nonwoven material; polyester fibers; polyurethane fibers; polyolefin fibers; polyamide fibers; natural fibers; cotton fibers; copolyester fibers; cellulose acetate fibers; polycellulose fibers; or any mixture thereof.

Suitable sizing agents include, e.g., waxes, silicone-containing compounds, fluorocarbon solutions, or combinations thereof. Suitable silicone-containing compounds include, e.g., polydimethyl siloxanes, dialkylsiloxanes, dimethylsiloxo vinyl alkenes, dialkylsiloxo vinyl alkenes, dimethylsiloxo acrylates, dialkylsiloxo acrylates, vinyl terminated polydimethylsiloxane, and vinyl terminated polydialkylsiloxane. The exemplary silicone-containing compounds are commercially available from, e.g., Goldschmidt Chemical Corp. (Essen, Germany); GE Silicones (Waterford, N.Y.); Wacker Silicone Corp. (Adrian, Mich.); and Dow Corning Corp. (Midland, Mich.).

Suitable fluorocarbon treated backings include, e.g., Vilmed M1585 W/HY, Vilmed M1585H/HY, Vilmed M1586 W/HY, Vilmed M1586H/HY, Vilmed M1570, Vilmed M1573 F, Vilmed M1573 FH, Vilmed M1577 F, Vilmed M1578 F, and Vilmed M1578 FH; which are all commercially available from Freudenberg Faservliesstoffe K G (Weinham, Germany).

The backing can also be manufactured from a suitable non-woven fabric that is commercially available from, e.g., Freudenberg Faservliesstoffe K G (Weinham, Germany); Sontara Technologies (division of DuPont Corporation) (Old Hickory, Tenn.); Lystil S. A. (Brignoud Cedex, France); Dexter Nonwovens (Windsor Locks, Conn.); and Chicopee (New Brusnwick, N.J.). Other commercial vendors that supply suitable non-woven fabrics can be found at the Technical Textile website (http://www.technical-textiles.net/technical-textiles-index/orgL.htm).

The use of a treated backing material (4), such as a fluorocarbon treated non-woven backing, typically allows for the effective control of the rate of penetration of the resin, such that the resin can solidify after it has begun to penetrate the backing, but before it has passed completely through the backing. In addition, the use of a backing material (4) that has been treated with a sizing agent allows for the effective control of the depth to which the resin will easily penetrate before solidifying.

The backing material (4) can have any suitable size (e.g., thickness) and weight, provided: the backing material (4) adheres to the wood-based composite panel (2) over the extended periods of time typically encountered with the lifespan of the wood-based composite panel (2); the metallic foil (6) adheres to the backing material (4) over the extended periods of time typically encountered with the lifespan of the wood-based composite panel (2); and the backing material (4) remains intact during the manufacturing process.

Specifically, the backing material (4) can have a thickness and weight such that the backing weighs up to about 100 pounds per 1,000 square feet; about 10 pounds per 1,000 square feet to about 75 pounds per 1,000 square feet; or about 20 pounds per 1,000 square feet to about 50 pounds per 1,000 square feet.

In one embodiment of the present invention, the backing material (4) can include webstock such as liner board, kraft paper, or a combination thereof. In another embodiment of the present invention, the backing material (4) can include kraft paper. In another embodiment of the present invention, the backing material (4) can include liner board.

Specifically, the backing material (4) can include liner board weighing more than about 5 pounds per 1,000 square feet, more than about 15 pounds per 1,000 square feet, or more than 25 pounds per 1,000 square feet. More specifically, the backing material (4) can include liner board weighing at least about 26 pounds per 1,000 square feet.

Metallic Foil

The metallic foil (6) (e.g., aluminum foil) is employed to provide a radiant barrier to the wood-based composite panel (2). Any suitable metallic foil (6) can be employed, provided: the backing material (4) adheres to the wood-based composite panel (2) over the extended periods of time typically encountered with the lifespan of the wood-based composite panel (2); the metallic foil (6) adheres to the backing material (4) over the extended periods of time typically encountered with the lifespan of the wood-based composite panel (2); the metallic foil (6) remains intact during the manufacturing process; the metallic foil (6) can effectively reflect a substantial amount (e.g., up to about 99%, up to about 95%, or up to about 90%) of the radiant energy and/or limit or stop a substantial amount (e.g., up to about 99%, up to about 95%, or up to about 90%) of radiant energy from passing through over the extended periods of time typically encountered with the lifespan of the wood-based composite panel (2); and the resulting radiant barrier wood-based composite panel (1) will be approved as such by the relevant regulatory body.

The metallic material can have any suitable size (e.g., thickness) and weight, provided: the backing material (4)

adheres to the wood-based composite panel (2) over the extended periods of time typically encountered with the lifespan of the wood-based composite panel (2); the metallic foil (6) adheres to the backing material (4) over the extended periods of time typically encountered with the lifespan of the wood-based composite panel (2); the metallic foil (6) remains intact during the manufacturing process; the metallic foil (6) can effectively reflect a substantial amount (e.g., up to about 99%, up to about 95%, or up to about 90%) of the radiant energy and/or limit or stop a substantial amount (e.g., up to about 99%, up to about 95%, or up to about 90%) of radiant energy from passing through over the extended periods of time typically encountered with the lifespan of the wood-based composite panel (2); and the resulting radiant barrier wood-based composite panel (1) will be approved as such by the relevant regulatory body.

Typically, the metallic foil (6) can have a thickness of up to about 0.001 inches, from about 0.0001 inches to about 0.0009 inches, or about 0.0002 inches to about 0.0005 inches.

The metallic foil (6) will have one or more apertures that will allow moisture or vapor to pass. It is believed that oriented strand board and plywood will preferably allow moisture or vapor to pass. As such, the apertures would allow such moisture or vapor to pass through the wood-based composite panel (2). In one embodiment of the present invention, the apertures are introduced into the metallic material prior to the metallic material contacting the flakes (12) of wood, veneers (13) of wood, or wood-based composite panel (2). In another embodiment of the present invention, the apertures are introduced into the metallic material subsequent to the metallic material contacting the flakes (12) of wood, veneers (13) of wood, or wood-based composite panel (2).

The apertures can have any suitable size and shape, provided: the apertures allow moisture or vapor to pass through the oriented strand board or plywood; the backing material (4) adheres to the wood-based composite panel (2) over the extended periods of time typically encountered with the lifespan of the wood-based composite panel (2); the metallic foil (6) adheres to the backing material (4) over the extended periods of time typically encountered with the lifespan of the wood-based composite panel (2); the metallic foil (6) remains intact during the manufacturing process; the metallic foil (6) can effectively reflect a substantial amount (e.g., up to about 99%, up to about 95%, or up to about 90%) of the radiant energy and/or limit or stop a substantial amount (e.g., up to about 99%, up to about 95%, or up to about 90%) of radiant energy from passing through over the extended periods of time typically encountered with the lifespan of the wood-based composite panel (2); and the resulting radiant barrier wood-based composite panel (1) will be approved as such by the relevant regulatory body.

Specifically, the apertures can have a size of less than about 0.1 inches in diameter, less than about 0.01 inches in diameter, less than about 0.001 inches in diameter, or less than about 0.0001 inches in diameter.

Any suitable number of apertures, per square inch of foil, can be present, provided: the apertures allow moisture or vapor to pass through the oriented strand board or plywood; the backing material (4) adheres to the wood-based composite panel (2) over the extended periods of time typically encountered with the lifespan of the wood-based composite panel (2); the metallic foil (6) adheres to the backing material (4) over the extended periods of time typically encountered with the lifespan of the wood-based composite panel (2); the metallic foil (6) remains intact during the manufacturing process; the metallic foil (6) can effectively reflect a substantial amount (e.g., up to about 99%, up to about 95%, or up to about 90%) of the radiant energy and/or limit or stop a substantial amount (e.g., up to about 99%, up to about 95%, or up to about 90%) of radiant energy from passing through over the extended periods of time typically encountered with the lifespan of the wood-based composite panel (2); and the resulting radiant barrier wood-based composite panel (1) will be approved as such by the relevant regulatory body.

Specifically, the metallic foil (6) can have above about 16 apertures per square inch of metallic foil (6), above about 20 apertures per square inch of metallic foil (6), above about 25 apertures per square inch of metallic foil (6), or above about 40 apertures per square inch of metallic foil (6).

The metallic foil (6) will include a substance that would effectively reflect a substantial amount of the radiant energy and/or limit or stop a substantial amount of radiant energy from passing through. The metallic foil (6) can be manufactured from any suitable metal or metals, provided: the apertures allow moisture or vapor to pass through the oriented strand board or plywood; the backing material (4) adheres to the wood-based composite panel (2) over the extended periods of time typically encountered with the lifespan of the wood-based composite panel (2); the metallic foil (6) adheres to the backing material (4) over the extended periods of time typically encountered with the lifespan of the wood-based composite panel (2); the metallic foil (6) remains intact during the manufacturing process; the metallic foil (6) can effectively reflect a substantial amount (e.g., up to about 99%, up to about 95%, or up to about 90%) of the radiant energy and/or limit or stop a substantial amount (e.g., up to about 99%, up to about 95%, or up to about 90%) of radiant energy from passing through over the extended periods of time typically encountered with the lifespan of the wood-based composite panel (2); and the resulting radiant barrier wood-based composite panel (1) will be approved as such by the relevant regulatory body.

Specifically, the metallic foil (6) can include titanium, vanadium, chromium, manganese, iron, cobalt, nickel, copper, zinc, aluminum, silver, palladium, platinum, gold, an alloy thereof, or a combination thereof. Since the cost of the metallic foil (6) will typically be a factor in the manufacturing of a radiant barrier wood-based composite panel (1) of the present invention, the presence of relatively expensive metals such as silver, gold, platinum, etc., will be minimal, if present at all. As such, relatively inexpensive metals such as aluminum will typically be employed in the metallic foil (6).

Specifically, the metallic foil (6) can be manufactured from aluminum, or an alloy thereof. More specifically, the metallic foil (6) can include up to 99.9 wt. % aluminum, up to about 99.5 wt. % aluminum, or up to about 99.0 wt. % aluminum.

The metallic foil (6) can be purchased, e.g., from Reynolds Alcoa (USA) or Niranda (Canada).

Step(s) in which Radiant Barrier Material is Added to Flakes

The flakes (12) of wood can be contacted with the radiant barrier material (10) after the flakes (12) have been contacted with the resin, after the flakes (12) have formed a blanket of flakes (12), and before the resin has been cured. As such, the radiant barrier material (10) can contact the blanket of flakes (12), and the resin can then be cured.

All publications, patents, and patent documents cited herein are incorporated by reference herein, as though individually incorporated by reference. The invention has been described with reference to various specific and preferred embodiments and techniques. However, it should be understood that many variations and modifications may be made while remaining within the spirit and scope of the invention.

It is appreciated that certain features of the invention, which are, for clarity, described in the context of separate embodiments, may also be provided in combination in a single embodiment. Conversely, various features of the invention which are for brevity, described in the context of a single embodiment, may also be provided separately or in any sub-combination.

What is claimed is:

1. A process for manufacturing a radiant barrier oriented strand board, the process comprising the steps:
    (i) contacting uncured flakes of wood with a first resin;
    (ii) orienting, in substantially alternate lengthwise and crosswise layers, the uncured flakes of wood to provide a blanket of substantially oriented uncured flakes;
    (iii) contacting the blanket of substantially oriented uncured flakes with a radiant barrier material having apertures extending therethrough, wherein the radiant barrier material has a pair of outer surfaces and a second resin located on at least a portion of one side of the pair of outer surfaces of the radiant barrier material, such that when the blanket of substantially oriented uncured flakes is contacted with the radiant barrier material, the blanket of substantially oriented uncured flakes contacts the second resin; wherein the radiant barrier material comprises a combination of metallic foil and backing material; and
    (iv) curing the first resin and the second resin by exposing the first resin and the second resin to at least one of an elevated temperature, an elevated pressure, and radiant energy; for a sufficient period of time; to effectively cure the first resin and the second resin; thereby effectively providing a radiant barrier oriented strand board.

2. The process of claim 1, wherein the radiant barrier oriented strand board exhibits a level of emissivity of less than about 0.05.

3. The process of claim 1, wherein the radiant barrier oriented strand board exhibits a level of emissivity of less than about 0.045.

4. The process of claim 1, wherein the radiant barrier oriented strand board exhibits a level of emissivity of less than about 0.04.

5. The process of claim 1, wherein the radiant barrier oriented strand board exhibits a level of emissivity of less than about 0.03.

6. The process of claim 1, wherein the radiant barrier oriented strand board exhibits a level of emissivity of less than about 0.02.

7. The process of claim 1, wherein the radiant barrier oriented strand board has a moisture vapor permeability of up to about 0.025 g/hr-m2-mm Hg.

8. The process of claim 1, wherein the radiant barrier oriented strand board has a moisture vapor permeability of up to about 0.0005 g/hr-m2-mm Hg.

9. The process of claim 1 wherein the apertures have an average diameter of greater than about 0.065 mm.

10. The process of claim 1 wherein the apertures have an average diameter of about 0.065 mm to about 3.0 mm.

11. The process of claim 1 wherein the apertures have an average diameter of about 0.08 mm to about 0.12 mm.

12. The process of claim 1 wherein the apertures are perforations.

13. The process of claim 1 wherein the apertures are plugged thereby creating a moisture vapor barrier.

14. The process of claim 1 wherein the apertures are unplugged thereby creating moisture vapor channels.

15. The process of claim 1 wherein the apertures are present in about 36 apertures per square inch of radiant barrier material or less, inclusive.

16. The process of claim 1 wherein the apertures are present in about 25 apertures per square inch of radiant barrier material or less, inclusive.

17. The process of claim 1 wherein the apertures are present in about 16 apertures per square inch of radiant barrier material or less, inclusive.

18. The process of claim 1 wherein the apertures are present in about 9 apertures per square inch of radiant barrier material or less, inclusive.

19. The process of claim 1 wherein the radiant barrier material is adhered to one outer surface of the blanket of substantially oriented flakes.

20. The process of claim 1 wherein the radiant barrier material is adhered to one outer surface of the blanket of substantially oriented flakes and another radiant barrier material is independently adhered to the other outer surface of the blanket of substantially oriented flakes.

21. The process of claim 1 wherein the radiant barrier material is adhered to the outer surface of the blanket of substantially oriented flakes employing a second resin.

22. The process of claim 21 wherein the second resin comprises a thermosetting polymer.

23. The process of claim 22 wherein the thermosetting polymer comprises a polyolefin resin.

24. The process of claim 23 wherein the polyolefin resin comprises a polyethylene resin.

25. The process of claim 1 wherein the metallic foil is aluminum foil.

26. The process of claim 25 wherein the aluminum foil has a thickness of about 0.0001 inches to about 0.001 inches.

27. The process of claim 1 wherein the metallic foil has oppositely facing surfaces, one surface is relatively shiny compared to the other surface, and the shiny surface faces outwardly.

28. The process of claim 1 wherein the metallic foil has oppositely facing surfaces, one surface is relatively shiny compared to the other surface, and the shiny surface faces inwardly.

29. The process of claim 1 wherein the backing material is liner board.

30. The process of claim 29 wherein the liner board has a weight of at least 25 lbs per thousand square feet.

31. The process of claim 1 wherein the metallic foil and backing material are adhered to each other with a third resin.

32. The process of claim 31 wherein the third resin comprises an aqueous polyvinyl acetate polymer.

33. The process of claim 1 wherein the blanket of substantially oriented uncured flakes is oriented strand board.

34. The process of claim 1, wherein the radiant barrier oriented strand board is fire retardant.

35. The process of claim 1, wherein the radiant barrier oriented strand board is moisture resistant.

36. The process of claim 1, wherein the radiant barrier oriented strand board is fungal resistant.

37. The process of claim 1 wherein the first resin comprises a thermosetting polymer.

38. The process of claim 37 wherein the thermosetting polymer comprises a phenolic resin, a formaldehyde resin, a resorcinolic resin, a melamine resin, an isocyanate resin, a urea resin, an epoxy resin, or a combination thereof.

39. The process of claim 1 wherein the first resin comprises a phenol-melamine-formaldehyde (PMF) resin.

40. The process of claim 1 wherein the flakes of wood are manufactured from a Western species of timber.

41. The process of claim 1 wherein the flakes of wood are manufactured from a Northern species of timber.

42. The process of claim 1 wherein the flakes of wood are manufactured from an Appalachian species of timber.

43. The process of claim 1 wherein the flakes of wood are manufactured from a Southern species of timber.

44. The process of claim 1 wherein the flakes of wood are manufactured from at least one of Incense-Cedar, Port-Orford-Cedar, Douglas Fir, White Fir, Western Hemlock, Western Larch, Lodgepole Pine, Ponderosa Pine, Sugar Pine, Western White Pine, Western Redcedar, Redwood, Engelmann Spruce, Sitka Spruce, Yellow-Cedar, Red Alder, Oregon Ash, Aspen, Black Cottonwood, California Black Oak, Oregon White Oak, Big Leaf Maple, Paper Birch, and Tanoak.

45. The process of claim 1 wherein the flakes of wood are manufactured from at least one of Northern White Cedar, Balsam Fir, Eastern Hemlock, Fraser Fir, Jack Pine, Red Pine, Eastern White Pine, Eastern Red Cedar, Eastern Spruce, Tamarack, Ash, Aspen, Basswood, Buckeye, Butternut, American Beech, Birch, Black Chemy, American Chestnut, Cottonwood, Elm, Hack Berry, True Hickory, Honey Locust, Black Locust, Hard Maple, Soft Maple, Red Oak, White Oak, American Sycamore, Black Walnut, and Yellow-Poplar.

46. The process of claim 1 wherein the flakes of wood are manufactured from at least one of Atlantic White Cedar, Bald Cypress, Fraser Fir, Southern Pine, Eastern Red Cedar, Ash, Basswood, Arnecan, Beech, Butternut, Cottonwood, Elm, Hackberry, Pecan Hickory, True Hickory, Honey Locust, Black Locust, Magnolia, Soft Maple, Red Oak, Sassafras, Sweetgum, American Sycamore, Tupelo, Black Walnut, Black Willow, and Yellow Poplar.

47. The process of claim 1 wherein the flakes of wood have a length of up to about 12 inches (30.5 cm).

48. The process of claim 1 wherein the flakes of wood have a length of about 4.0 inches (10.2 cm.) to about 6.0 inches (15.2 cm).

49. The process of claim 1 wherein the flakes of wood have a width of up to about 12 inches (30.5 cm).

50. The process of claim 1 wherein the flakes of wood have a width of about 1.5 inches (3.8 cm) to about 2.5 inches (6.4 cm).

51. The process of claim 1 wherein the flakes of wood have a thickness of up to about 0.25 inches (0.64 cm).

52. The process of claim 1 wherein the flakes of wood have a thickness of about 0.020 inches (0.051 cm) to about 0.030 inches (0.076 cm).

53. The process of claim 1 wherein the flakes of wood have a strand length divided by strand width of at least 3.0.

54. The process of claim 1 wherein the first resin substantially covers the entire surface of the uncured flakes of wood.

55. The process of claim 1 wherein the first resin impregnates the flakes of wood.

56. The process of claim 1 wherein the first resin completely impregnates the flakes of wood.

57. The process of claim 1 wherein the first resin partially impregnates the flakes of wood.

58. The process of claim 1 wherein the first resin impregnates up to about 1/10 of the flakes of wood.

59. The process of claim 1 wherein the first resin impregnates up to about 1/4 of the flakes of wood.

60. The process of claim 1 wherein the first resin impregnates up to about 1/2 of the flakes of wood.

61. The process of claim 1 wherein the first resin impregnates up to about 3/4 of the flakes of wood.

62. The process of claim 1 wherein the first resin impregnates up to about 99/100 of the flakes of wood.

63. The process of claim 1 wherein the first resin impregnates about 1/20 to about 1/2 the flakes of wood.

64. The process of claim 1 wherein the first resin covers at least about 60% of the surface of the uncured flakes of wood.

65. The process of claim 1 wherein the first resin covers at least about 70% of the surface of the uncured flakes of wood.

66. The process of claim 1 wherein the first resin covers at least about 80% of the surface of the uncured flakes of wood.

67. The process of claim 1 wherein the first resin covers at least about 90% of the surface of the uncured flakes of wood.

68. The process of claim 1 wherein the apertures are formed by spike rolling the radiant barrier material.

69. The process of claim 1 wherein the apertures are formed by spike rolling the radiant barrier material from the backing material side to the metallic foil side.

70. The process of claim 1 wherein the apertures are formed by spike rolling the radiant barrier material from the metallic foil side to the backing material side.

71. The process of claim 1 wherein the elevated temperature is about 162° C. (325° F.) to about 246° C. (475° F.).

72. The process of claim 1 wherein the elevated temperature is about 177° C. (350° F.) to about 232° C. (450° F.).

73. The process of claim 1 wherein the elevated temperature is about 191° C. (375° F.) to about 218° C. (425° F.).

74. The process of claim 1 wherein the elevated pressure is about 25 atm. (367 psi) to about 55 atm. (808 psi).

75. The process of claim 1 wherein the elevated pressure is about 30 atm. (441 psi) to about 50 atm. (735 psi).

76. The process of claim 1 wherein the elevated pressure is about 34 atm. (500 psi) to about 48 atm. (705 psi).

77. The process of claim 1 wherein the elevated pressure is about 35 atm. (514 psi) to about 45 atm. (661 psi).

78. The process of claim 1 wherein the sufficient period of time is up to about 10.0 minutes.

79. The process of claim 1 wherein the sufficient period of time is about 3.0 minutes to about 9.0 minutes.

80. The process of claim 1 wherein the radiant energy is UV light.

81. The process of claim 1 wherein the radiant energy is electron beam.

82. The process of claim 1 wherein the radiant energy is neutron beam.

83. The process of claim 1 wherein the radiant energy is proton beam.

84. The process of claim 1 wherein the radiant energy is microwave.

85. The process of claim 1 wherein the radiant energy is beta radiation.

86. The process of claim 1 wherein the radiant energy is gamma radiation.

87. The process of claim 1 wherein the radiant energy is infra red.

88. The process of claim 1 wherein the radiant energy is radio frequency.

89. A process for manufacturing a radiant barrier oriented strand board, the process comprising the steps:
(i) contacting uncured flakes of wood with a first resin;
(ii) orienting, in substantially alternate lengthwise and crosswise layers, the uncured flakes of wood to provide a blanket of substantially oriented uncured flakes;
(iii) contacting the blanket of substantially oriented uncured flakes with a radiant barrier material having apertures extending therethrough, wherein the radiant barrier material has a pair of outer surfaces and a second resin located on at least a portion of one side of the pair of outer surfaces of the radiant barrier material, such that when the blanket of substantially oriented uncured flakes is contacted with the radiant barrier material, the blanket of substantially oriented uncured flakes contacts the second resin; wherein the radiant barrier material comprises a combination of metallic foil and backing material; and
(iv) curing the first resin and the second resin by exposing the first resin and the second resin to at least one of an elevated temperature, an elevated pressure, and radiant energy; for a sufficient period of time; to effectively cure the first resin and the second resin; thereby effectively providing a radiant barrier oriented strand board;
wherein the radiant barrier oriented strand board exhibits a level of emissivity of less than about 0.05 and a moisture vapor permeability of up to about 0.025 g/hr-m2-mm Hg.

* * * * *